United States Patent
Kim et al.

(10) Patent No.: US 12,453,565 B1
(45) Date of Patent: Oct. 28, 2025

(54) SHOCK WAVE CATHETERS AND METHODS OF USE THEREOF FOR TREATING, IMAGING, AND CHARACTERIZING BODY LUMENS

(71) Applicant: Shockwave Medical, Inc., Santa Clara, CA (US)

(72) Inventors: Hyung Joo Kim, Santa Clara, CA (US); Thomas Charles Hasenberg, Campbell, CA (US); Leela Goel, Santa Clara, CA (US)

(73) Assignee: SHOCKWAVE MEDICAL, INC., Santa Clara, CA (US)

( * ) Notice: Subject to any disclaimer, the term of this patent is extended or adjusted under 35 U.S.C. 154(b) by 0 days.

(21) Appl. No.: 18/950,765

(22) Filed: Nov. 18, 2024

(51) Int. Cl.
  *A61B 17/22* (2006.01)
  *A61B 17/00* (2006.01)
  (Continued)

(52) U.S. Cl.
  CPC .. *A61B 17/22022* (2013.01); *A61B 17/00234* (2013.01); *A61B 90/30* (2016.02);
  (Continued)

(58) Field of Classification Search
  CPC ........ A61B 17/22022; A61B 17/00234; A61B 90/30; A61B 90/37; A61B 2017/00057;
  (Continued)

(56) References Cited

U.S. PATENT DOCUMENTS

| 2,916,647 A | 12/1959 | George |
| 3,412,288 A | 11/1968 | Ostrander |

(Continued)

FOREIGN PATENT DOCUMENTS

| AU | 2009313507 B2 | 11/2014 |
| AU | 2013284490 B2 | 5/2018 |

(Continued)

OTHER PUBLICATIONS

De Korte et al., (2002). "Intravascular ultrasound elastography: an overview," Ultrasonics, 40(1-8):859-865.

(Continued)

*Primary Examiner* — Shaun L David
*Assistant Examiner* — Rachael L Geiger
(74) *Attorney, Agent, or Firm* — Morrison & Foerster LLP

(57) ABSTRACT

Shock wave catheters and methods of use thereof are disclosed herein for intravascular lithotripsy (IVL) and intravascular imaging of a body lumen. The shock wave catheter can include an elongate tube; at least one shock wave emitter disposed at a distal portion of the elongate tube and configured to emit shock waves for treating an occlusion in a body lumen; at least one sensor for imaging the body lumen, the at least imaging sensor disposed at the distal portion of the elongate tube; and at least one enclosure enclosing the at least one shock wave emitter and the at least one sensor. The at least one sensor may be an ultrasound transducer for intravascular ultrasound (IVUS) imaging of the body lumen. Alternatively, the at least one sensor may be an optical coherence tomography (OCT) sensor for OCT imaging of the body lumen.

30 Claims, 15 Drawing Sheets

(51) Int. Cl.
*A61B 90/00* (2016.01)
*A61B 90/30* (2016.01)

(52) U.S. Cl.
CPC .... *A61B 90/37* (2016.02); *A61B 2017/00057* (2013.01); *A61B 2017/00106* (2013.01); *A61B 2017/00238* (2013.01); *A61B 2017/00305* (2013.01); *A61B 2017/22025* (2013.01); *A61B 2017/22028* (2013.01); *A61B 2017/22074* (2013.01); *A61B 2090/309* (2016.02); *A61B 2090/3735* (2016.02); *A61B 2090/378* (2016.02)

(58) Field of Classification Search
CPC .......... A61B 2017/00106; A61B 2017/00238; A61B 2017/00305; A61B 2017/22025; A61B 2017/22028; A61B 2017/22074; A61B 2090/309; A61B 2090/3735; A61B 2090/378
See application file for complete search history.

(56) References Cited

U.S. PATENT DOCUMENTS

| | | |
|---|---|---|
| 3,413,976 A | 12/1968 | Roze |
| 3,524,101 A | 8/1970 | Barbini |
| 3,583,766 A | 6/1971 | Padberg |
| 3,785,382 A | 1/1974 | Schmidt-Kloiber et al. |
| 3,902,499 A | 9/1975 | Shene |
| 3,942,531 A | 3/1976 | Hoff et al. |
| 4,027,674 A | 6/1977 | Tessler et al. |
| 4,030,505 A | 6/1977 | Tessler |
| 4,445,509 A | 5/1984 | Auth |
| 4,662,126 A | 5/1987 | Malcolm |
| 4,662,375 A | 5/1987 | Hepp et al. |
| 4,671,254 A | 6/1987 | Fair |
| 4,685,458 A | 8/1987 | Leckrone |
| 4,741,405 A | 5/1988 | Moeny et al. |
| 4,809,682 A | 3/1989 | Forssmann et al. |
| 4,813,934 A | 3/1989 | Engelson et al. |
| 4,878,495 A | 11/1989 | Grayzei |
| 4,890,603 A | 1/1990 | Filler |
| 4,900,303 A | 2/1990 | Lemelson |
| 4,990,134 A | 2/1991 | Auth |
| 4,994,032 A | 2/1991 | Sugiyama et al. |
| 5,009,232 A | 4/1991 | Hassler et al. |
| 5,046,503 A | 9/1991 | Schneiderman |
| 5,057,103 A | 10/1991 | Davis |
| 5,057,106 A | 10/1991 | Kasevich et al. |
| 5,061,240 A | 10/1991 | Cherian |
| 5,078,717 A | 1/1992 | Parins et al. |
| 5,102,402 A | 4/1992 | Dror et al. |
| 5,103,804 A | 4/1992 | Abele et al. |
| 5,116,227 A | 5/1992 | Levy |
| 5,152,767 A | 10/1992 | Sypal et al. |
| 5,152,768 A | 10/1992 | Bhatta |
| 5,154,722 A | 10/1992 | Filip et al. |
| 5,176,675 A | 1/1993 | Watson et al. |
| 5,195,508 A | 3/1993 | Muller et al. |
| 5,245,988 A | 9/1993 | Einars et al. |
| 5,246,447 A | 9/1993 | Rosen et al. |
| 5,254,121 A | 10/1993 | Manevitz et al. |
| 5,281,231 A | 1/1994 | Rosen et al. |
| 5,295,958 A | 3/1994 | Shturman |
| 5,304,134 A | 4/1994 | Kraus et al. |
| 5,321,715 A | 6/1994 | Trost |
| 5,324,255 A | 6/1994 | Passafaro et al. |
| 5,336,234 A | 8/1994 | Vigil et al. |
| 5,362,309 A | 11/1994 | Carter |
| 5,364,393 A | 11/1994 | Auth et al. |
| 5,368,591 A | 11/1994 | Lennox et al. |
| 5,395,335 A | 3/1995 | Jang |
| 5,417,208 A | 5/1995 | Winkler |
| 5,425,735 A | 6/1995 | Rosen et al. |
| 5,454,809 A | 10/1995 | Janssen |
| 5,472,406 A | 12/1995 | de la Torre et al. |
| 5,582,578 A | 12/1996 | Zhong et al. |
| 5,584,843 A | 12/1996 | Wulfman et al. |
| 5,603,731 A | 2/1997 | Whitney |
| 5,609,606 A | 3/1997 | O'Boyle |
| 5,662,590 A | 9/1997 | de la Torre et al. |
| 5,709,676 A | 1/1998 | Alt |
| 5,846,218 A | 12/1998 | Brisken et al. |
| 5,891,089 A | 4/1999 | Katz et al. |
| 5,893,840 A | 4/1999 | Hull et al. |
| 5,931,805 A | 8/1999 | Brisken |
| 6,007,530 A | 12/1999 | Dornhofer et al. |
| 6,033,371 A | 3/2000 | Torre et al. |
| 6,056,722 A | 5/2000 | Jayaraman |
| 6,080,119 A | 6/2000 | Schwarze et al. |
| 6,083,232 A | 7/2000 | Cox |
| 6,090,104 A | 7/2000 | Webster et al. |
| 6,113,560 A | 9/2000 | Simnacher |
| 6,132,444 A | 10/2000 | Shturman et al. |
| 6,146,358 A | 11/2000 | Rowe |
| 6,186,963 B1 | 2/2001 | Schwarze et al. |
| 6,210,408 B1 | 4/2001 | Chandrasekaran et al. |
| 6,215,734 B1 | 4/2001 | Moeny et al. |
| 6,217,531 B1 | 4/2001 | Reitmajer |
| 6,267,747 B1 | 7/2001 | Samson et al. |
| 6,277,138 B1 | 8/2001 | Levinson et al. |
| 6,287,272 B1 | 9/2001 | Brisken et al. |
| 6,352,535 B1 | 3/2002 | Lewis et al. |
| 6,364,894 B1 | 4/2002 | Healy et al. |
| 6,367,203 B1 | 4/2002 | Graham et al. |
| 6,371,971 B1 | 4/2002 | Tsugita et al. |
| 6,398,792 B1 | 6/2002 | O'Connor |
| 6,406,486 B1 | 6/2002 | de la Torre et al. |
| 6,440,124 B1 | 8/2002 | Esch et al. |
| 6,494,890 B1 | 12/2002 | Shturman et al. |
| 6,514,203 B2 | 2/2003 | Bukshpan |
| 6,524,251 B2 | 2/2003 | Rabiner et al. |
| 6,589,253 B1 | 7/2003 | Cornish et al. |
| 6,607,003 B1 | 8/2003 | Wilson |
| 6,638,246 B1 | 10/2003 | Naimark et al. |
| 6,652,547 B2 | 11/2003 | Rabiner et al. |
| 6,656,152 B2 | 12/2003 | Putz |
| 6,666,834 B2 | 12/2003 | Restle et al. |
| 6,689,089 B1 | 2/2004 | Tiedtke et al. |
| 6,736,784 B1 | 5/2004 | Menne et al. |
| 6,740,081 B2 | 5/2004 | Hilal |
| 6,755,821 B1 | 6/2004 | Fry |
| 6,939,320 B2 | 9/2005 | Lennox |
| 6,989,009 B2 | 1/2006 | Lafontaine |
| 7,066,904 B2 | 6/2006 | Rosenthal et al. |
| 7,087,061 B2 | 8/2006 | Chernenko et al. |
| 7,241,295 B2 | 7/2007 | Maguire |
| 7,309,324 B2 | 12/2007 | Hayes et al. |
| 7,389,148 B1 | 6/2008 | Morgan |
| 7,505,812 B1 | 3/2009 | Eggers et al. |
| 7,569,032 B2 | 8/2009 | Naimark et al. |
| 7,850,685 B2 | 12/2010 | Kunis et al. |
| 7,853,332 B2 | 12/2010 | Olsen et al. |
| 7,873,404 B1 | 1/2011 | Patton |
| 7,951,111 B2 | 5/2011 | Drasler et al. |
| 8,162,859 B2 | 4/2012 | Schultheiss et al. |
| 8,177,801 B2 | 5/2012 | Kallok et al. |
| 8,353,923 B2 | 1/2013 | Shturman |
| 8,556,813 B2 | 10/2013 | Cioanta et al. |
| 8,574,247 B2 | 11/2013 | Adams et al. |
| 8,728,091 B2 | 5/2014 | Hakala et al. |
| 8,747,416 B2 | 6/2014 | Hakala et al. |
| 8,888,788 B2 | 11/2014 | Hakala et al. |
| 8,956,371 B2 | 2/2015 | Hawkins et al. |
| 8,956,374 B2 | 2/2015 | Hawkins et al. |
| 9,005,216 B2 | 4/2015 | Hakala et al. |
| 9,011,462 B2 | 4/2015 | Adams et al. |
| 9,011,463 B2 | 4/2015 | Adams et al. |
| 9,044,618 B2 | 6/2015 | Hawkins et al. |
| 9,044,619 B2 | 6/2015 | Hawkins et al. |
| 9,072,534 B2 | 7/2015 | Hakala et al. |
| 9,138,249 B2 | 9/2015 | Adams et al. |
| 9,180,280 B2 | 11/2015 | Hawkins et al. |
| 9,198,825 B2 | 12/2015 | Katragadda et al. |

(56) References Cited

U.S. PATENT DOCUMENTS

| | | |
|---|---|---|
| 9,237,984 B2 | 1/2016 | Hawkins et al. |
| 9,333,000 B2 | 5/2016 | Hakala et al. |
| 9,421,025 B2 | 8/2016 | Hawkins et al. |
| 9,433,428 B2 | 9/2016 | Hakala et al. |
| 9,486,431 B2 | 11/2016 | McClain et al. |
| 9,522,012 B2 | 12/2016 | Adams |
| 9,554,815 B2 | 1/2017 | Adams |
| 9,642,673 B2 | 5/2017 | Adams et al. |
| 9,981,071 B2 | 5/2018 | McClain et al. |
| 9,993,292 B2 | 6/2018 | Adams et al. |
| 10,039,561 B2 | 8/2018 | Adams et al. |
| 10,118,015 B2 | 11/2018 | De La Rama et al. |
| 10,149,690 B2 | 12/2018 | Hawkins et al. |
| 10,154,799 B2 | 12/2018 | Van Der Weide et al. |
| 10,159,505 B2 | 12/2018 | Hakala et al. |
| 10,206,698 B2 | 2/2019 | Hakala et al. |
| 10,226,265 B2 | 3/2019 | Ku et al. |
| 10,441,300 B2 | 10/2019 | Hawkins |
| 10,441,757 B2 | 10/2019 | Kaufman et al. |
| 10,517,620 B2 | 12/2019 | Adams |
| 10,517,621 B1 | 12/2019 | Adams |
| 10,555,744 B2 | 2/2020 | Nguyen et al. |
| 10,603,473 B2 | 3/2020 | Kaufman et al. |
| 10,682,178 B2 | 6/2020 | Adams et al. |
| 10,702,293 B2 | 7/2020 | Hawkins et al. |
| 10,709,462 B2 | 7/2020 | Nguyen et al. |
| 10,814,108 B2 | 10/2020 | Kaufman et al. |
| 10,959,743 B2 | 3/2021 | Adams et al. |
| 10,966,737 B2 | 4/2021 | Nguyen |
| 10,973,538 B2 | 4/2021 | Hakala et al. |
| 11,000,299 B2 | 5/2021 | Hawkins et al. |
| 11,020,135 B1 | 6/2021 | Hawkins |
| 11,076,874 B2 | 8/2021 | Hakala et al. |
| 11,267,968 B2 | 3/2022 | Osswald et al. |
| 11,337,713 B2 | 5/2022 | Nguyen et al. |
| 11,344,713 B2 | 5/2022 | Schoenle et al. |
| 11,432,834 B2 | 9/2022 | Adams |
| 11,517,338 B2 | 12/2022 | Hawkins |
| 11,534,187 B2 | 12/2022 | Bonutti |
| 11,596,424 B2 | 3/2023 | Hakala et al. |
| 11,622,780 B2 | 4/2023 | Nguyen et al. |
| 11,672,959 B2 | 6/2023 | Stankus et al. |
| 11,696,799 B2 | 7/2023 | Adams et al. |
| 11,771,449 B2 | 10/2023 | Adams et al. |
| 11,844,739 B2 | 12/2023 | Warlick |
| 12,035,932 B1 | 7/2024 | Nunes et al. |
| 12,290,268 B2 | 5/2025 | Sariibrahimoglu et al. |
| 2001/0044596 A1 | 11/2001 | Jaafar |
| 2002/0045890 A1 | 4/2002 | Celliers et al. |
| 2002/0082553 A1 | 6/2002 | Duchamp |
| 2002/0177889 A1 | 11/2002 | Brisken et al. |
| 2003/0004434 A1 | 1/2003 | Greco et al. |
| 2003/0176873 A1 | 9/2003 | Chernenko et al. |
| 2003/0229370 A1 | 12/2003 | Miller |
| 2004/0006333 A1 | 1/2004 | Arnold et al. |
| 2004/0010249 A1 | 1/2004 | Truckai et al. |
| 2004/0044308 A1 | 3/2004 | Naimark et al. |
| 2004/0097963 A1 | 5/2004 | Seddon |
| 2004/0097996 A1 | 5/2004 | Rabiner et al. |
| 2004/0162508 A1 | 8/2004 | Uebelacker |
| 2004/0249401 A1 | 12/2004 | Rabiner et al. |
| 2004/0254570 A1 | 12/2004 | Hadjicostis et al. |
| 2005/0015953 A1 | 1/2005 | Keidar |
| 2005/0021013 A1 | 1/2005 | Visuri et al. |
| 2005/0059965 A1 | 3/2005 | Eberl et al. |
| 2005/0075662 A1 | 4/2005 | Pedersen et al. |
| 2005/0090888 A1 | 4/2005 | Hines et al. |
| 2005/0113722 A1 | 5/2005 | Schultheiss |
| 2005/0113822 A1 | 5/2005 | Fuimaono et al. |
| 2005/0171527 A1 | 8/2005 | Bhola |
| 2005/0228372 A1 | 10/2005 | Truckai et al. |
| 2005/0245866 A1 | 11/2005 | Azizi |
| 2005/0251131 A1 | 11/2005 | Lesh |
| 2006/0004286 A1 | 1/2006 | Chang et al. |
| 2006/0069424 A1 | 3/2006 | Acosta et al. |
| 2006/0074484 A1 | 4/2006 | Huber |
| 2006/0184076 A1 | 8/2006 | Gill et al. |
| 2006/0190022 A1 | 8/2006 | Beyar et al. |
| 2006/0221528 A1 | 10/2006 | Li et al. |
| 2007/0016112 A1 | 1/2007 | Schultheiss et al. |
| 2007/0088380 A1 | 4/2007 | Hirszowicz et al. |
| 2007/0129667 A1 | 6/2007 | Tiedtke et al. |
| 2007/0156129 A1 | 7/2007 | Kovalcheck |
| 2007/0239082 A1 | 10/2007 | Schultheiss et al. |
| 2007/0239253 A1 | 10/2007 | Jagger et al. |
| 2007/0244423 A1 | 10/2007 | Zumeris et al. |
| 2007/0250052 A1 | 10/2007 | Wham |
| 2007/0255270 A1 | 11/2007 | Carney |
| 2007/0282301 A1 | 12/2007 | Segalescu et al. |
| 2007/0299481 A1 | 12/2007 | Syed et al. |
| 2008/0097251 A1 | 4/2008 | Babaev |
| 2008/0188913 A1 | 8/2008 | Stone et al. |
| 2009/0041833 A1 | 2/2009 | Bettinger et al. |
| 2009/0227992 A1 | 9/2009 | Nir et al. |
| 2009/0230822 A1 | 9/2009 | Kushculey et al. |
| 2009/0247945 A1 | 10/2009 | Levit et al. |
| 2009/0254114 A1 | 10/2009 | Hirszowicz et al. |
| 2009/0299447 A1 | 12/2009 | Jensen et al. |
| 2010/0016862 A1 | 1/2010 | Hawkins et al. |
| 2010/0036294 A1 | 2/2010 | Mantell et al. |
| 2010/0094209 A1 | 4/2010 | Drasler et al. |
| 2010/0114020 A1 | 5/2010 | Hawkins et al. |
| 2010/0114065 A1 | 5/2010 | Hawkins et al. |
| 2010/0121322 A1 | 5/2010 | Swanson |
| 2010/0160838 A1 | 6/2010 | Krespi |
| 2010/0179424 A1 | 7/2010 | Warnking et al. |
| 2010/0239635 A1 | 9/2010 | McClain et al. |
| 2010/0286709 A1 | 11/2010 | Diamant et al. |
| 2010/0305565 A1 | 12/2010 | Truckai et al. |
| 2011/0034832 A1 | 2/2011 | Cioanta et al. |
| 2011/0118634 A1 | 5/2011 | Golan |
| 2011/0208185 A1 | 8/2011 | Diamant et al. |
| 2011/0257523 A1 | 10/2011 | Hastings et al. |
| 2011/0295227 A1 | 12/2011 | Hawkins et al. |
| 2012/0071715 A1 | 3/2012 | Beyar et al. |
| 2012/0071889 A1 | 3/2012 | Mantell et al. |
| 2012/0095461 A1 | 4/2012 | Herscher et al. |
| 2012/0116289 A1 | 5/2012 | Hawkins et al. |
| 2012/0143177 A1 | 6/2012 | Avitall et al. |
| 2012/0157991 A1 | 6/2012 | Christian |
| 2012/0203255 A1 | 8/2012 | Hawkins et al. |
| 2012/0253186 A1* | 10/2012 | Simpson ............ A61B 6/12 600/426 |
| 2012/0253358 A1 | 10/2012 | Golan et al. |
| 2013/0030431 A1 | 1/2013 | Adams |
| 2013/0041355 A1 | 2/2013 | Heeren et al. |
| 2013/0116714 A1 | 5/2013 | Adams et al. |
| 2013/0123694 A1 | 5/2013 | Subramaniyan et al. |
| 2013/0150874 A1 | 6/2013 | Kassab |
| 2013/0253622 A1 | 9/2013 | Hooven |
| 2014/0046229 A1 | 2/2014 | Hawkins et al. |
| 2014/0200443 A1 | 7/2014 | Chang et al. |
| 2014/0214061 A1 | 7/2014 | Adams et al. |
| 2015/0320432 A1 | 11/2015 | Adams |
| 2016/0151081 A1 | 6/2016 | Adams et al. |
| 2016/0324534 A1 | 11/2016 | Hawkins et al. |
| 2017/0135709 A1 | 5/2017 | Nguyen et al. |
| 2017/0311965 A1 | 11/2017 | Adams |
| 2019/0388110 A1 | 12/2019 | Nguyen et al. |
| 2020/0000484 A1 | 1/2020 | Hawkins |
| 2021/0007762 A1 | 1/2021 | Chang et al. |
| 2021/0038311 A1* | 2/2021 | Shelton ............ A61B 1/307 |
| 2021/0085287 A1* | 3/2021 | Hennersperger ..... A61B 8/5207 |
| 2021/0085347 A1 | 3/2021 | Phan et al. |
| 2021/0085383 A1 | 3/2021 | Vo et al. |
| 2021/0338258 A1 | 11/2021 | Hawkins et al. |
| 2022/0015785 A1 | 1/2022 | Hakala et al. |
| 2022/0152427 A1 | 5/2022 | Bonutti et al. |
| 2022/0183708 A1 | 6/2022 | Phan et al. |
| 2022/0240958 A1 | 8/2022 | Nguyen et al. |
| 2022/0280765 A1 | 9/2022 | Tabiliran et al. |
| 2023/0043475 A1 | 2/2023 | Adams |
| 2023/0123003 A1 | 4/2023 | Vo |
| 2023/0260120 A1* | 8/2023 | Sakamoto ............ A61B 8/12 |

(56) References Cited

U.S. PATENT DOCUMENTS

| | | | |
|---|---|---|---|
| 2023/0293197 | A1 | 9/2023 | Nguyen et al. |
| 2023/0310073 | A1 | 10/2023 | Adams et al. |
| 2023/0329731 | A1 | 10/2023 | Hakala et al. |
| 2023/0380849 | A1 | 11/2023 | Adams et al. |
| 2023/0404605 | A1* | 12/2023 | Vo .............. A61B 17/22022 |
| 2024/0032951 | A1* | 2/2024 | Tong .............. A61M 1/741 |
| 2024/0260981 | A1 | 8/2024 | Betelia et al. |
| 2024/0325032 | A1* | 10/2024 | Sariibrahimoglu .................... A61B 17/1679 |

FOREIGN PATENT DOCUMENTS

| | | |
|---|---|---|
| CA | 2104414 A1 | 2/1995 |
| CN | 1204242 A | 1/1999 |
| CN | 1269708 A | 10/2000 |
| CN | 1942145 A | 4/2007 |
| CN | 101043914 A | 9/2007 |
| CN | 102057422 A | 5/2011 |
| CN | 102271748 A | 12/2011 |
| CN | 102355856 A | 2/2012 |
| CN | 102765785 A | 11/2012 |
| CN | 203564304 U | 4/2014 |
| CN | 113289212 A | 8/2021 |
| CN | 114098898 A | 3/2022 |
| CN | 114305855 B | 10/2023 |
| CN | 116999680 A | 11/2023 |
| CN | 117752920 A | 3/2024 |
| DE | 3038445 A1 | 5/1982 |
| DE | 202006014285 U1 | 12/2006 |
| EP | 0442199 A2 | 8/1991 |
| EP | 0571306 A1 | 11/1993 |
| EP | 623360 A1 | 11/1994 |
| EP | 0647435 A1 | 4/1995 |
| EP | 2253884 A1 | 11/2010 |
| EP | 2362798 B1 | 4/2014 |
| JP | S62-099210 U | 6/1987 |
| JP | S62-275446 A | 11/1987 |
| JP | H03-63059 A | 3/1991 |
| JP | H06-125915 A | 5/1994 |
| JP | H07-47135 A | 2/1995 |
| JP | H08-89511 A | 4/1996 |
| JP | H10-99444 A | 4/1998 |
| JP | H10-314177 A | 12/1998 |
| JP | H10-513379 A | 12/1998 |
| JP | 2002538932 A | 11/2002 |
| JP | 2004081374 A | 3/2004 |
| JP | 2004357792 A | 12/2004 |
| JP | 2005501597 A | 1/2005 |
| JP | 2005095410 A | 4/2005 |
| JP | 2005515825 A | 6/2005 |
| JP | 2006516465 A | 7/2006 |
| JP | 2007289707 A | 11/2007 |
| JP | 2007532182 A | 11/2007 |
| JP | 2008506447 A | 3/2008 |
| JP | 2011513694 A | 4/2011 |
| JP | 2011520248 A | 7/2011 |
| JP | 2011524203 A | 9/2011 |
| JP | 2011528963 A | 12/2011 |
| JP | 2012505050 A | 3/2012 |
| JP | 2012508042 A | 4/2012 |
| JP | 2013517907 A | 5/2013 |
| JP | 2015525657 A | 9/2015 |
| JP | 2015528327 A | 9/2015 |
| JP | 6029828 B2 | 11/2016 |
| JP | 6081510 B2 | 2/2017 |
| JP | 2023514737 A | 4/2023 |
| WO | WO-1989011307 A1 | 11/1989 |
| WO | WO-1996024297 A1 | 8/1996 |
| WO | WO-1999000060 A1 | 1/1999 |
| WO | WO-1999002096 A1 | 1/1999 |
| WO | WO-2000056237 A2 | 9/2000 |
| WO | WO-2004069072 A2 | 8/2004 |
| WO | WO-2005099594 A1 | 10/2005 |
| WO | WO-2005102199 A1 | 11/2005 |
| WO | WO-2006006169 A2 | 1/2006 |
| WO | WO-2006127158 A2 | 11/2006 |
| WO | WO-2007088546 A2 | 8/2007 |
| WO | WO-2007149905 A2 | 12/2007 |
| WO | WO-2009121017 A1 | 10/2009 |
| WO | WO-2009126544 A1 | 10/2009 |
| WO | WO-2009136268 A1 | 11/2009 |
| WO | WO-2009152352 A2 | 12/2009 |
| WO | WO-2010014515 A2 | 2/2010 |
| WO | WO-2010054048 A2 | 5/2010 |
| WO | WO-2011006017 A1 | 1/2011 |
| WO | WO-2011094111 A2 | 8/2011 |
| WO | WO-2011143468 A2 | 11/2011 |
| WO | WO-2012025833 A2 | 3/2012 |
| WO | WO-2013059735 A1 | 4/2013 |
| WO | WO-2014025397 A1 | 2/2014 |
| WO | WO-2014025620 A1 | 2/2014 |
| WO | WO-2015017499 A1 | 2/2015 |
| WO | WO-2019099218 A1 | 5/2019 |
| WO | WO-2024140073 A1 | 7/2024 |

OTHER PUBLICATIONS

Tang et al., (2022). "Deep thrombosis characterization using photoacoustic imaging with intravascular light delivery," Biomedical Engineering Letters, 12(2):135-145.

Wu et al., (2022). "Ultrasound-guided Intravascular Sonothrombolysis with a Dual Mode Ultrasound Catheter: In-vitro study," IEEE Transactions on Ultrasonics, Ferroelectrics, and Frequency Control, 69(6):1917-1925, 22 pages.

Unpublished U.S. Appl. No. 18/524,575 (Hasenberg et al.), filed Nov. 30, 2023, titled "Systems, Devices, and Methods for Generating Shock Waves in a Forward Direction," (Copy not submitted herewith pursuant to the waiver of 37 C.F.R. § 1.98(a)(2)(iii)).

Aderibigbe, (2018). "In Situ-Based Gels for Nose to Brain Delivery for the Treatment of Neurological Diseases," Pharmaceutics, 10(2):40, 17 pages.

Burgess et al., (2011). "Targeted Delivery of Neural Stem Cells to the Brain Using MRI-Guided Focused Ultrasound to Disrupt the Blood-Brain Barrier," PLoS One, 6(11):e27877, 6 pages.

Burgess et al., (2014). "Alzheimer Disease in a Mouse Model: MR Imaging-guided Focused Ultrasound Targeted to the Hippocampus Opens the Blood-Brain Barrier and Improves Pathologic Abnormalities and Behavior," Radiology, 273(3):736-745.

Chassenieux et al., (2016). "Recent trends in pH/thermo-responsive self-assembling hydrogels: from polyions to peptide-based polymeric gelators," Soft Matter, 12:1344-1359.

Durham et al., (2024). "Current clinical investigations of focused ultrasound blood-brain barrier disruption: A review," Neurotherapeutics, 21:e00352, 9 pages.

Erdo et al., (2018). "Evaluation of intranasal delivery route of drug administration for brain targeting," Brain Research Bulletin, 143:155-170.

Hanson et al., (2008). "Intranasal delivery bypasses the blood-brain barrier to target therapeutic agents to the central nervous system and treat neurodegenerative disease," BMC Neuroscience, 9:S5, 4 pages.

Hynynen et al., (2001). "Noninvasive MR Imaging-guided Focal Opening of the Blood-Brain Barrier in Rabbits," Radiology, 220:640-646.

International Search Report and Written Opinion for International Patent Application No. PCT/US2024/022291 mailed on Dec. 19, 2024, 11 pages.

International Search Report and Written Opinion received for International Application No. PCT/US2024/022272 mailed Jul. 15, 2024, 9 pages.

Kaplan, (2020). "How long does the balloon sinuplasty procedure take?" available online at <https://www.kaplansinusrelief.com/blog/how-long-does-balloon-sinuplasty-procedure-take/>, 3 pages.

Kinoshita et al., (2006). "Targeted delivery of antibodies through the blood-brain barrier by MRI-guided focused ultrasound," Biochemical and Biophysical Research Communications, 340:1085-1090.

(56) References Cited

OTHER PUBLICATIONS

Kung et al., (2018). "Focused shockwave induced blood-brain barrier opening and transfection," Scientific Reports, 8:2218, 11 pages.
Lipsman et al., (2013). "MR-guided focused ultrasound thalamotomy for essential tremor: a proof-of-concept study," Lancet Neurol, 12(5):462-8.
Lipsman et al., (2018). "Blood-brain barrier opening in Alzheimer's disease using MR-guided focused ultrasound," Nature Communications, 9:2336, 8 pages.
Lochhead et al., (2012). "Intranasal delivery of biologics to the central nervous system," Adv Drug Deliv Rev, 64(7):614-28.
MedlinePlus, (2021). "Neurosciences," available online at <https://medlineplus.gov/ency/article/007456.htm>, 5 pages.
Meng et al., (2019). "Safety and efficacy of focused ultrasound induced blood-brain barrier opening, an integrative review of animal and human studies," Journal of Controlled Release, 309:25-36.
Merkus et al., (2007). "Can nasal drug delivery bypass the blood-brain barrier?: questioning the direct transport theory," Drugs R D, 8(3):133-44.
Mistry et al., (2009). "Nanoparticles for direct nose-to-brain delivery of drugs," Int J Pharm, 379(1):146-57.
Non-Final Office Action received for U.S. Appl. No. 18/620,583, mailed on Aug. 13, 2024, 8 pages.
Notice of Allowance received for U.S. Appl. No. 18/620,583, mailed on Mar. 27, 2025, 5 pages.
Park et al., (2021). "Extensive frontal focused ultrasound mediated blood-brain barrier opening for the treatment of Alzheimer's disease: a proof-of-concept study," Transl Neurodegener, 10:44, 11 pages.
Rezai et al., (2022). "Focused ultrasound-mediated blood-brain barrier opening in Alzheimer's disease: long-term safety, imaging, and cognitive outcomes," J Neurosurg, 139:275-283.
Singh et al., (2012). "Injectable In-Situ Gelling Controlled Release Drug Delivery System," Int. J. Drug Dev. & Res., 4(2):56-69.
Sosnik et al., (2017). "Polymeric Hydrogels as Technology Platform for Drug Delivery Applications," Gels, 3(3):25, 22 pages.
Timbie et al., (2015). "Drug and gene delivery across the blood-brain barrier with focused ultrasound," Journal of Controlled Release, 219:61-75, 41 pages.
Treat et al., (2007). "Targeted delivery of doxorubicin to the rat brain at therapeutic levels using MRI-guided focused ultrasound," Int. J. Cancer, 121:901-907.
Wu et al., (2023). "The blood-brain barrier: structure, regulation, and drug delivery," Signal Transduction and Targeted Therapy, 8:217, 27 pages.
Non-Final Office Action received for U.S. Appl. No. 18/620,248, mailed on Feb. 12, 2025, 10 pages.
Final Office Action received for U.S. Appl. No. 18/620,248, mailed on Sep. 5, 2024, 9 pages.
Non-Final Office Action received for U.S. Appl. No. 18/620,248, mailed on May 6, 2024, 8 pages.
Unpublished U.S. Appl. No. 18/595,148, filed Mar. 4, 2024 for Hasenberg et al., titled "Burst Mode Operation of Intravascular Lithotripsy (IVL)," (Copy not submitted herewith pursuant to the waiver of 37 C.F.R. § 1.98(a)(2)(iii)).
Unpublished U.S. Appl. No. 18/620,248, filed Mar. 28, 2024 titled "Drug Delivery Beyond the Blood-Brain Barrier Using Shock Waves," (Copy not submitted herewith pursuant to the waiver of 37 C.F.R. § 1.98(a)(2)(iii)).

* cited by examiner

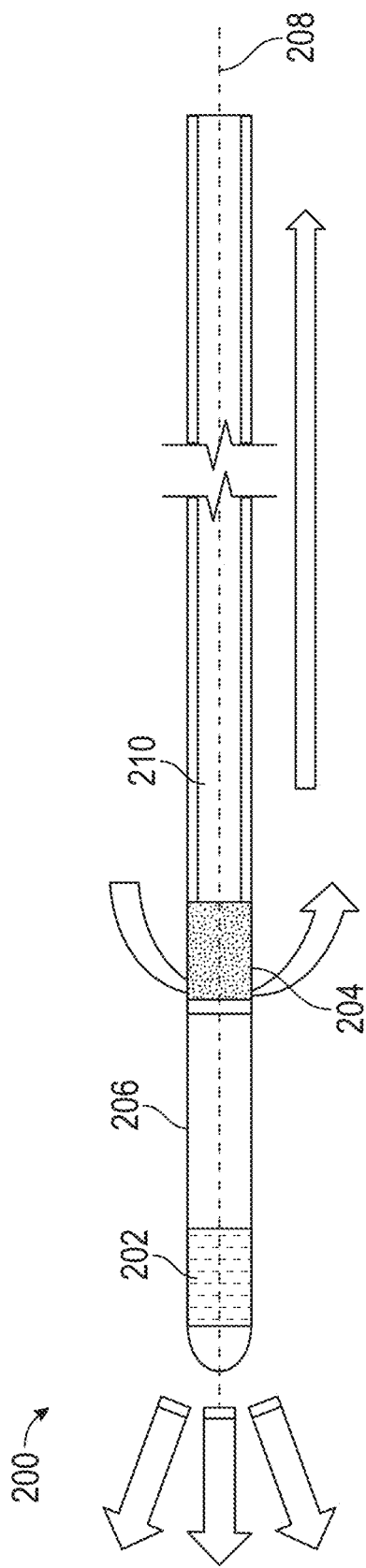
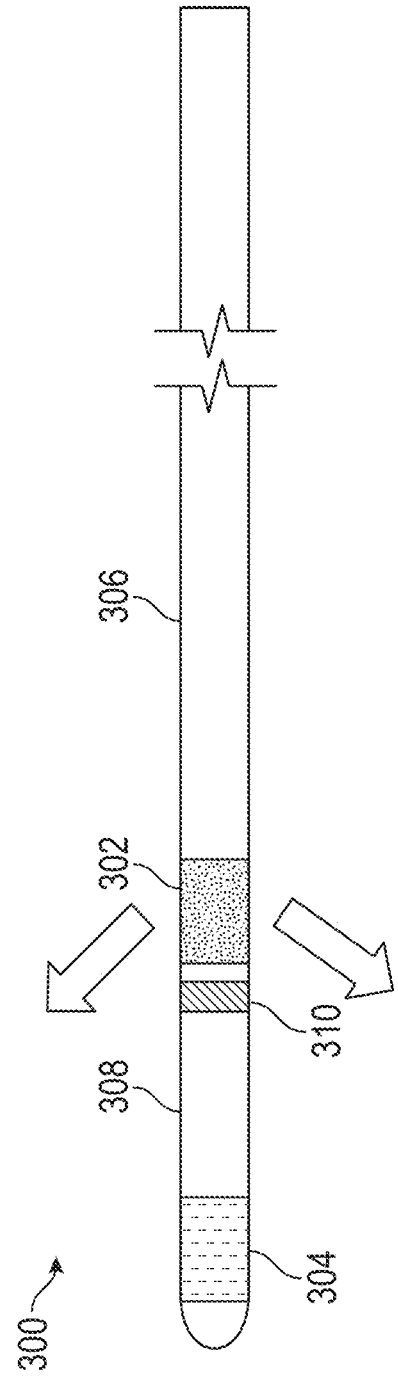
FIG. 2
FIG. 3

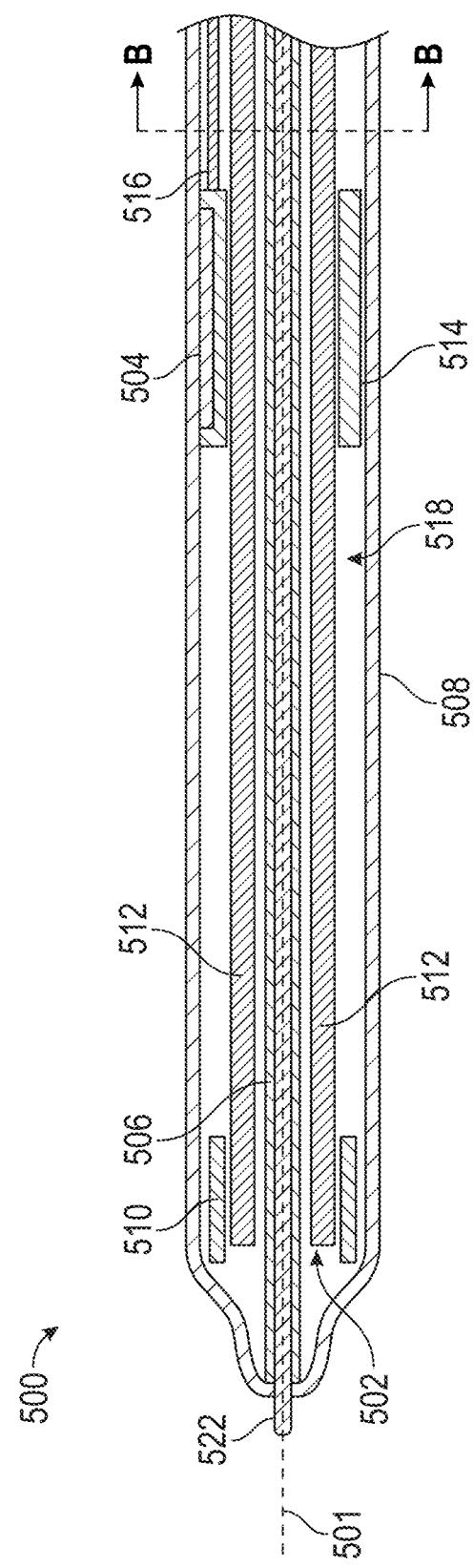

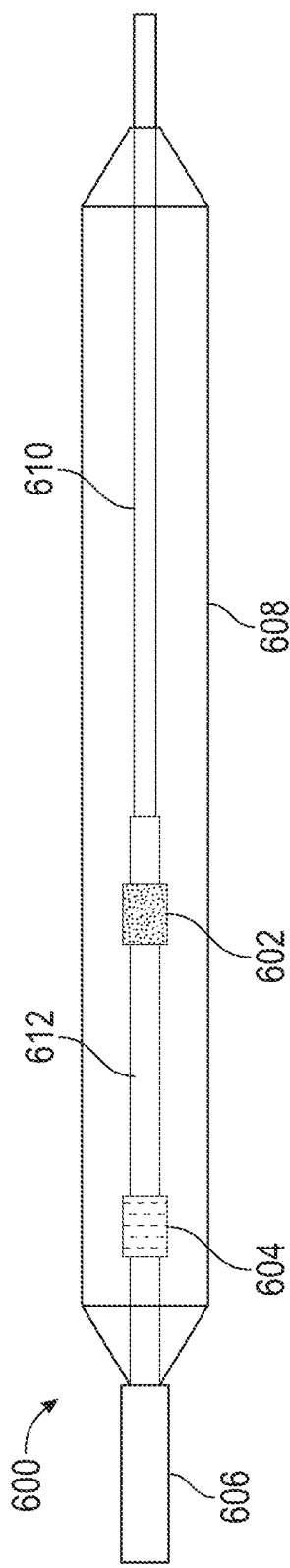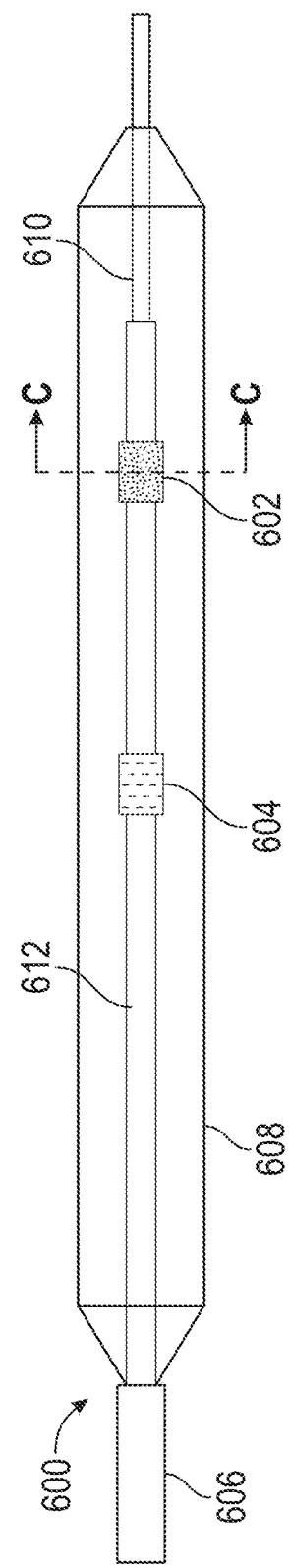
FIG. 6A
FIG. 6B

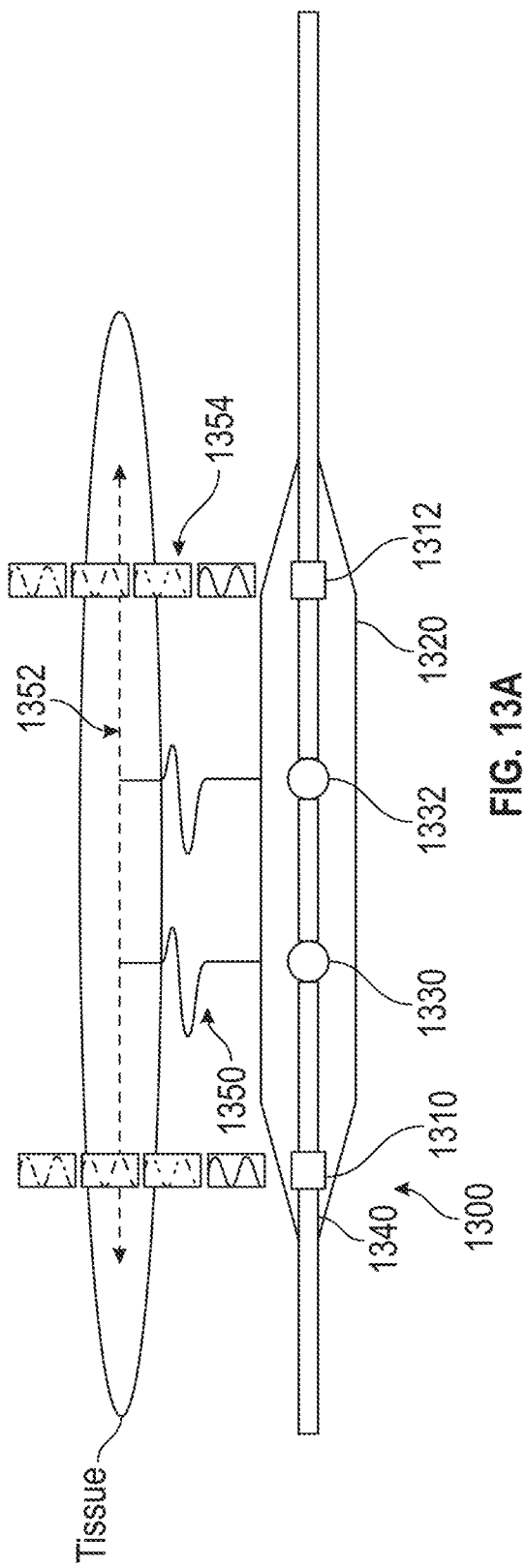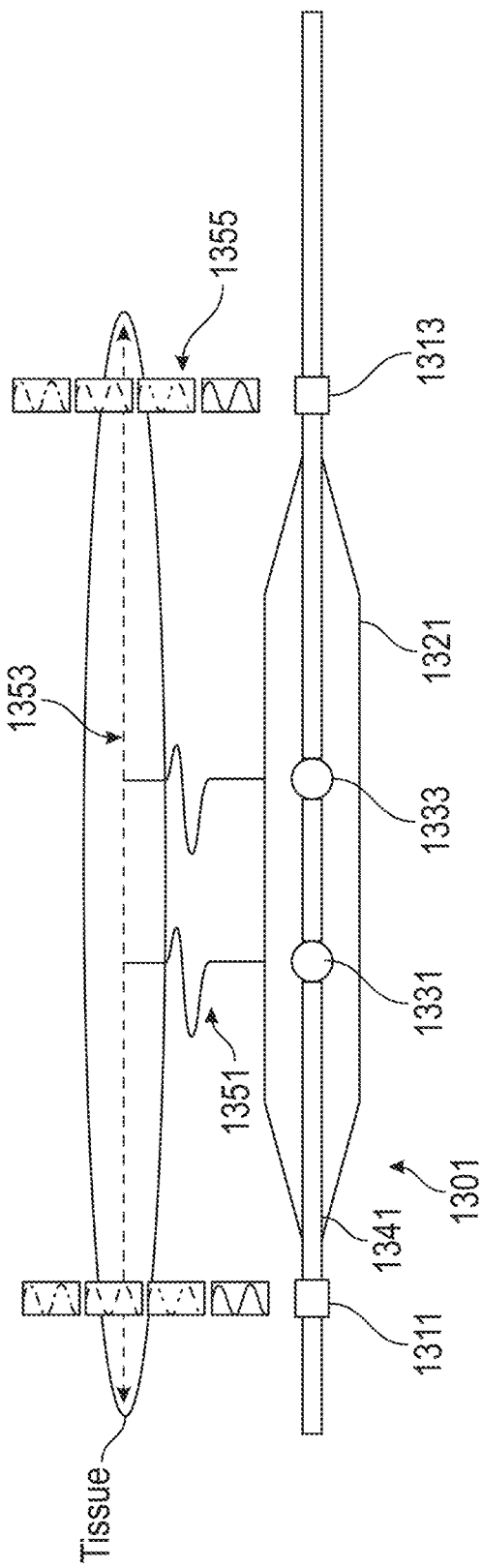
FIG. 13A
FIG. 13B

SHOCK WAVE CATHETERS AND METHODS OF USE THEREOF FOR TREATING, IMAGING, AND CHARACTERIZING BODY LUMENS

FIELD OF THE DISCLOSURE

The present disclosure relates generally to the field of medical devices and methods, and more specifically to shock wave catheter devices for treating calcified lesions in body lumens, such as calcified lesions and occlusions in vasculature and heart valves.

BACKGROUND

A wide variety of catheters have been developed for treating calcified lesions, such as calcified lesions in vasculature associated with arterial disease and in valves of the heart (e.g., aortic valves). For example, treatment systems for percutaneous coronary angioplasty or peripheral angioplasty use angioplasty balloons to dilate a calcified lesion and restore normal blood flow in a vessel. In these types of procedures, a catheter carrying a balloon is advanced into the vasculature along a guidewire until the balloon is aligned with calcified plaques. The balloon is then pressurized (normally to greater than 10 atm), causing the balloon to expand in a vessel to push calcified plaques back into the vessel wall and dilate occluded regions of vasculature. Treatment systems for valvuloplasty similarly use a balloon catheter to open or enlarge the calcified valve area.

More recently, the technique and treatment of intravascular lithotripsy (IVL) has been developed, which is an interventional procedure to modify calcified plaque in diseased arteries. A similar technique, shock wave valvuloplasty, has been developed to modify and treat calcified plaque in diseased heart valves. The mechanism of plaque modification is through use of a catheter having one or more acoustic shock wave-generating sources located within a liquid that can generate acoustic shock waves, particularly at ultrasonic frequencies, that modify the calcified plaque. Shock wave devices vary in design with respect to the energy source used to generate the acoustic shock waves, with two exemplary energy sources being electrohydraulic generation and laser generation. Shock waves can alternatively be referred to as ultrasonic short pressure pulses.

For electrohydraulic generation of acoustic shock waves, a conductive solution (e.g., saline) may be contained within an enclosure that surrounds electrodes or can be flushed through a tube that surrounds the electrodes. The calcified plaque modification is achieved by creating acoustic shock waves within the catheter by an electrical discharge across the electrodes. The energy from this electrical discharge enters the surrounding fluid faster than the speed of sound, generating an acoustic shock wave. In addition, the energy creates one or more rapidly expanding and collapsing vapor bubbles that generate secondary shock waves. The shock waves propagate radially outward and modify calcified plaque within the blood vessels or heart valves. For laser generation of acoustic shock waves, a laser pulse is transmitted into and absorbed by a fluid within the catheter. This absorption process rapidly heats and vaporizes the fluid, thereby generating the rapidly expanding and collapsing vapor bubble, as well as the acoustic shock waves that propagate outward and modify the calcified plaque. The acoustic shock wave intensity is higher if a fluid is chosen that exhibits strong absorption at the laser wavelength that is employed. These examples of shock wave generating devices are not intended to be a comprehensive list of potential energy sources to create shock waves.

The IVL process may be considered different from standard atherectomy procedures in that it cracks calcium but does not debulk or liberate the cracked calcium from the tissue. Hence, generally speaking, IVL should not require aspiration nor embolic protection. Further, due to the compliance of a normal blood vessel and non-calcified plaque, the shock waves produced by IVL do not modify the normal vessel tissue or non-calcified plaque. Moreover, IVL does not carry the same degree of risk of perforation, dissection, or other damage to vasculature as atherectomy procedures or angioplasty procedures using cutting or scoring balloons.

More specifically, catheters to deliver shock wave therapy have been developed that include pairs of electrodes for electrohydraulically generating shock waves inside an angioplasty or valvuloplasty balloon. Shock wave devices can be particularly effective for treating calcified plaque lesions because the acoustic pressure from the shock waves can crack and disrupt lesions near the angioplasty or valvuloplasty balloon without harming the surrounding tissue. In these devices, the catheter is advanced over a guidewire through a patient's vasculature until it is positioned proximal to and/or aligned with a calcified plaque lesion in a body lumen. The balloon is then inflated with conductive fluid (using a relatively low pressure of 2-4 atm) so that the balloon expands to contact the lesion but is not an inflation pressure that substantively displaces the lesion. Voltage pulses can then be applied across the electrodes of the electrode pairs to produce acoustic shock waves that propagate through the walls of the angioplasty or valvuloplasty balloon and into the lesions. Once the lesions have been cracked by the acoustic shock waves, the balloon can be expanded further to increase the cross-sectional area of the lumen and improve blood flow through the lumen. Alternative devices to deliver shock wave therapy can be within a closed volume other than an angioplasty or valvuloplasty balloon, such as a cap, balloons of variable compliancy, or other enclosure.

Intravascular imaging techniques such as intravascular ultrasound (IVUS) and optical computed tomography (OCT) are commonly used in interventional procedures to visualize the internal structures of body lumens, such as blood vessels and heart valves. Each of IVUS and OCT can provide cross-sectional images of the body lumen, which is particularly useful for assessing lesions, such as calcified plaque, in body lumens. These intravascular imaging techniques can also be utilized for measuring characteristics of the lumen (e.g., lumen diameter vessel size, valve leaflet size, etc.) to inform stent placement, valve replacement, and/or angioplasty/valvuloplasty balloon size for subsequent interventional procedures.

SUMMARY

Disclosed herein are systems, devices, and methods that combine shock wave treatment and intravascular imaging functionalities in a single catheter. An exemplary catheter includes at least one shock wave emitter for generating shock waves that can break, or otherwise disrupt, hardened lesions within a body lumen and at least one imaging sensor for imaging the body lumen from within. The at least one imaging sensor can be, for example, an intravascular ultrasound (IVUS) or optical computed tomography (OCT) imaging sensor. The at least one shock wave emitter may be configured to emit shock waves in a distal direction for treating lesions that are distal of the emitter(s), and the imaging sensor(s) may be disposed proximally of the at least one shock wave emitter such that the shock waves from the shock wave emitter(s) do not damage or destroy the imaging sensor(s). Additionally, or alternatively, the imaging sensor (s) and the shock wave emitter(s) may be moveable relative to one another, which may facilitate imaging of the body lumen and/or protection of the imaging sensor(s) from shock waves emitted by the shock wave emitter(s).

In some aspects, a catheter for imaging and treating occlusions of body lumens is provided, comprising: an elongate tube; at least one shock wave emitter disposed at a distal portion of the elongate tube and configured to emit shock waves in a distal direction for treating an occlusion in a body lumen; at least one sensor for imaging the body lumen, the at least one sensor disposed at the distal portion of the elongate tube; and at least one enclosure enclosing the at least one shock wave emitter.

In some aspects, a catheter for imaging and treating occlusions of body lumens is provided, comprising: an elongate tube; at least one shock wave emitter disposed at a distal portion of the elongate tube and configured to emit shock waves for treating an occlusion in a body lumen; at least one sensor for imaging the body lumen, the at least one sensor disposed at the distal portion of the elongate tube; and at least one enclosure enclosing the at least one shock wave emitter, wherein the at least one shock wave emitter and the at least one sensor are moveable relative to one another.

In some aspects, a catheter for imaging and treating occlusions of body lumens is provided, comprising: an elongate tube; at least one shock wave emitter disposed at a distal portion of the elongate tube and configured to emit shock waves for treating an occlusion in a body lumen; at least one sensor for imaging or characterizing the body lumen, the at least one sensor comprising at least one ultrasound transducer disposed at the distal portion of the elongate tube; and at least one enclosure enclosing the at least one shock wave emitter.

In some aspects, a method for imaging and treating occlusions of body lumens is provided, comprising: advancing a distal portion of a catheter through a body lumen such that the distal portion is positioned proximate to an occlusion of the body lumen; generating at least one shock wave by at least one shock wave emitter disposed at the distal portion of the catheter to treat the occlusion, where the at least one shock wave is emitted in a distal direction; and following generating the at least one shock wave, imaging the body lumen by at least one sensor disposed at the distal portion of the catheter.

DESCRIPTION OF THE FIGURES

The invention will now be described, by way of example only, with reference to the accompanying drawings, in which:

FIG. 2 illustrates a diagram of an exemplary shock wave catheter in which the shock wave emitter is disposed distally of the imaging module, according to one or more aspects of the present disclosure.

FIG. 3 illustrates a diagram of an exemplary shock wave catheter in which the shock wave emitter is disposed proximally of the imaging module, according to one or more aspects of the present disclosure.

FIG. 5A illustrates a cross-sectional view along a longitudinal axis of an exemplary shock wave catheter in accordance with the diagram of FIG. 2, according to one or more aspects of the present disclosure.

FIGS. 6A-6B illustrate diagrams of an exemplary shock wave catheter in which the shock wave emitter and the imaging module are movable relative to the enclosure of the shock wave catheter, according to one or more aspects of the present disclosure.

FIG. 13A illustrates a diagram of an exemplary shock wave catheter having a pair shock wave emitters flanked by a pair of ultrasound transducers within the enclosure of the shock wave catheter, according to one or more aspects of the present disclosure.

FIG. 13B illustrates a diagram of an exemplary shock wave catheter having a pair shock wave emitters within the enclosure flanked by a pair of ultrasound transducers outside of the enclosure of the shock wave catheter, according to one or more aspects of the present disclosure.

DETAILED DESCRIPTION

Figure 1A:
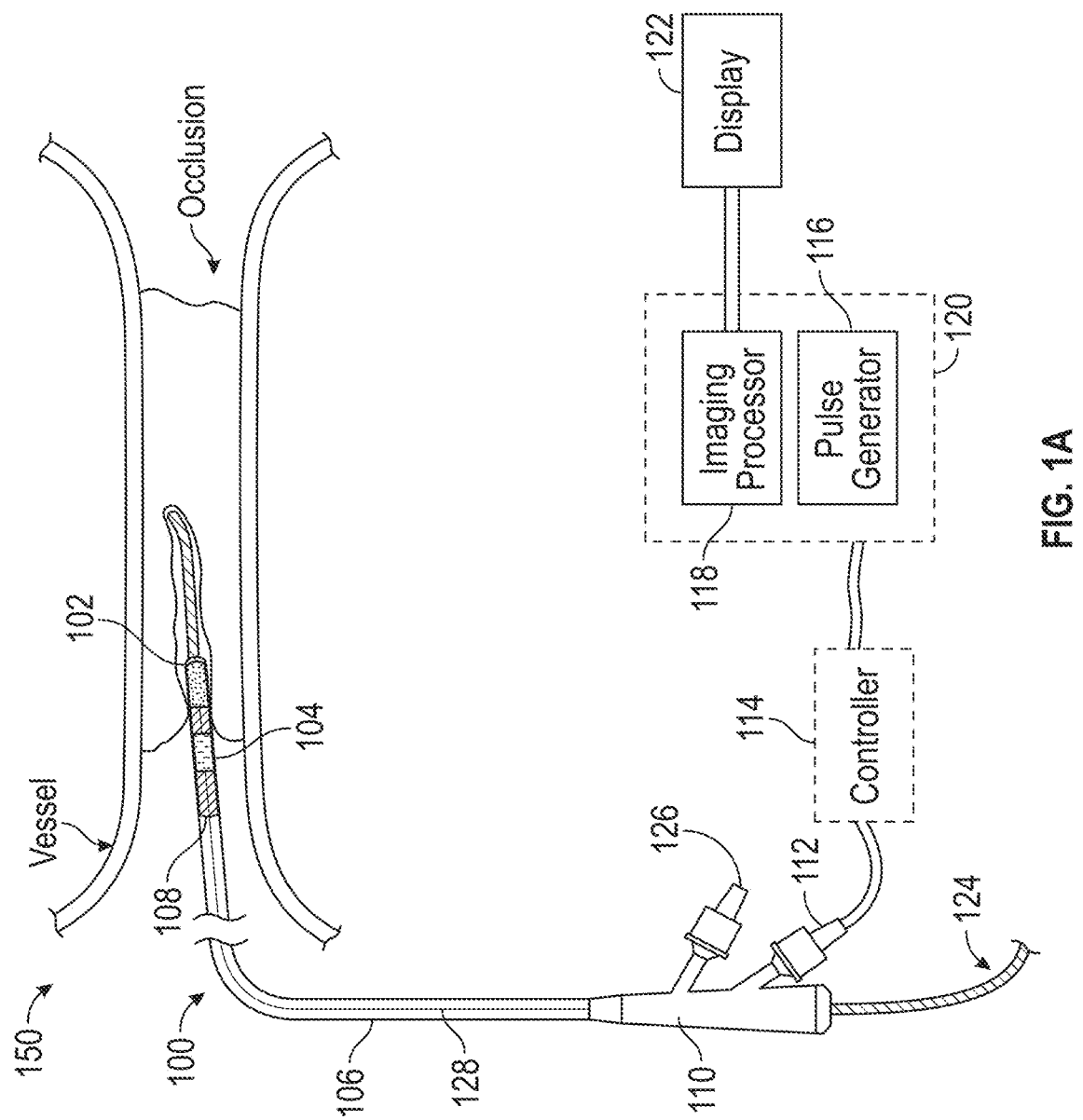
FIG. 1A illustrates an exemplary shock wave catheter system for use in treating an occlusion of a body lumen, according to one or more aspects of the present disclosure.

The following description is presented to enable a person of ordinary skill in the art to make and use the various embodiments and aspects thereof disclosed herein. Descriptions of specific devices, assemblies, techniques, and applications are provided only as examples. Various modifications to the examples described herein will be readily apparent to those of ordinary skill in the art, and the general principles described herein may be applied to other examples and applications without departing from the spirit and scope of the various embodiments and aspects thereof. Thus, the various embodiments and aspects thereof are not intended to be limited to the examples described herein and shown, but are to be accorded the scope consistent with the claims.

Described herein are catheters configured for providing both shock wave-based treatment and intravascular imaging of body lumens and methods of use thereof. The shock wave catheters can include at least one shock wave emitter and at least one sensor for imaging. The imaging sensor may be configured, for example, for intravascular ultrasound (IVUS), optical computed tomography (OCT), or other variants thereof (e.g., micro-OCT). The imaging sensor may be disposed proximally of the shock wave emitter to enable the shock wave emitter to emit shock waves in a distal direction without damaging the sensor. Each of the imaging sensor and shock wave emitter may be disposed along an elongate tube of the shock wave catheter. The imaging sensor and/or shock wave emitter may be moveable relative to the elongate tube to obtain cross-sectional images of the body lumen and/or protect the imaging sensor from shock waves emitted by the shock wave emitter.

Also described herein are catheters configured for providing shock wave-based treatment as well as for characterizing tissue (e.g., lesions) and methods of use thereof. The shock wave catheters can include at least one shock wave emitter and at least one ultrasound sensor for characterizing the tissue, such as the lesion of the tissue, and/or the efficacy of the treatment. A shock wave catheter may include at least one shock wave emitter, at least one ultrasound sensor for characterizing the tissue, and at least one imaging sensor (e.g., ultrasound or OCT) for imaging the body lumen.

Typical vasculature (e.g., peripheral and coronary) interventions can include the use of separate imaging and treatment systems to image the body lumen and treat the body lumen (e.g., including heart valves), one or more of which may be a catheter-based system (e.g., a balloon-based catheter system). This can require the physician to introduce and remove the catheter(s) from the vasculature multiple times during a single procedure. For example, the physician may use an IVUS or OCT catheter-based imaging system to evaluate an occlusion of the body lumen and/or to measure the body lumen for subsequent angioplasty or valvuloplasty procedures. Following imaging, the physician may exchange the IVUS or OCT catheter with a balloon-based catheter for performing an angioplasty, valvuloplasty, atherectomy, or IVL procedure. The shock wave catheters disclosed herein can decrease operating time during procedures by providing a single catheter system for both imaging and treating the body lumen, thus negating the need for swapping out the device during the procedure. Additionally, using a shock wave catheter having imaging capabilities can lead to greater accuracy in measuring the body lumen for stent placement, valve replacement, or balloon-catheter sizing, since the shock wave treatment may modify part of the occlusion prior to imaging and enable more precise measuring of the body lumen. Finally, current intravascular imaging (e.g., IVUS) systems are configured specifically for coronary use, and thus have limited applicability in below-the-knee (BTK) peripheral vasculature. The shock wave catheters described herein may be usable in a variety of vasculature, including coronary and BTK vasculature, as well as vasculature including heart valves (e.g., the aorta and aortic valve). Accordingly, overall, using the shock wave catheters disclosed herein, the workflow and outcomes of vasculature interventional procedures can be improved.

As used herein, the term "electrode" refers to an electrically conducting element (typically made of metal) that receives electrical current and subsequently releases the electrical current to another electrically conducting element. In the context of the present disclosure, electrodes are often positioned relative to each other, such as in an arrangement of an inner electrode and an outer electrode. Accordingly, as used herein, the term "electrode pair" refers to two electrodes that are positioned adjacent to each other such that application of a sufficiently high voltage to the electrode pair will cause an electrical current to transmit across the gap (also referred to as a "spark gap") between the two electrodes (e.g., from an inner electrode to an outer electrode, or vice versa, optionally with the electricity passing through a conductive fluid or gas therebetween). In some contexts, one or more electrode pairs may also be referred to as an electrode assembly. In the context of the present disclosure, the term "emitter" broadly refers to the region of an electrode assembly where the current transmits across the electrode pair, generating a shock wave. The terms "emitter sheath" and "emitter band" refer to a continuous or discontinuous band of conductive material that may form one or more electrodes of one or more electrode pairs, thereby forming a location of one or more emitters.

Components of emitters, including electrodes and emitter sheaths/bands, may be formed from a metal, such as stainless steel, copper, tungsten, platinum, palladium, molybdenum, cobalt, chromium, iridium, an alloy or alloys thereof, such as cobalt-chromium, platinum-chromium, cobalt-chromium-platinum-palladium-iridium, or platinum-iridium, or a mixture of such materials.

For treatment of an occlusion in a blood vessel or heart valve, the voltage pulse applied by a power source, including any of the power sources described herein (which may also be referred to herein as voltage sources or pulse generators), is typically in the range of from about five hundred to three thousand volts (500 V-3,000 V). In some implementations, the voltage pulse applied by the voltage source can be up to about fifteen thousand volts (15,000 V) or higher than fifteen thousand volts (15,000 V). The pulse width of the applied voltage pulses ranges between two microseconds and six microseconds (2-6 µs). The repetition rate or frequency of the applied voltage pulses may be between about 1 Hz and 100 Hz. The total number of pulses applied by the power source may be, for example, sixty (60) pulses, eighty (80) pulses, one hundred twenty (120) pulses, three hundred (300) pulses, or up to five hundred (500) pulses, or any increments of pulses within this range. Alternatively, or additionally, in some examples, the power source may be configured to deliver a packet of micro-pulses having a sub-frequency between about 100 Hz-10 kHz. The preferred voltage, repetition rate, and number of pulses may vary depending on, e.g., the size of the lesion, the extent of calcification, the size of the blood vessel or heart valve, the attributes of the patient, or the stage of treatment. For instance, a physician may start with low-energy shock waves and increase the energy as needed during the procedure, or vice versa. The magnitude of the shock waves can be controlled by controlling the voltage, current, duration, and repetition rate of the pulsed voltage from the power source.

In some embodiments, an IVL catheter is a so-called "rapid exchange-type" (Rx) catheter provided with an opening portion through which a guidewire is guided (e.g., through a middle portion of a central tube in a longitudinal direction). In other embodiments, an IVL catheter may be an "over-the-wire-type" (OTW) catheter in which a guidewire lumen is formed throughout the overall length of the catheter, and a guidewire is guided through the proximal end of a hub.

Although shock wave devices described herein generate shock waves based on high voltage applied to electrodes, it should be understood that a shock wave device additionally or alternatively may comprise a laser and optical fibers as a shock wave emitter system whereby the laser source delivers energy through an optical fiber and into a fluid to form shock waves and/or cavitation bubbles.

In the following description of the various embodiments, reference is made to the accompanying drawings, in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising" when used herein specify the presence of stated features, integers, steps, operations, elements, components, and/or units, but do not preclude the presence or addition of one or more other features, integers, steps, operations, elements, components, units, and/or groups thereof. As provided herein, it should be appreciated that any disclosure of a numerical range describing dimensions or measurements, such as thickness, length, weight, time, frequency, temperature, voltage, current, angle, etc., is inclusive of any numerical increment or gradation within the ranges set forth relative to the given dimension or measurement. Furthermore, numerical designators such as "first," "second," "third," "fourth," etc. are merely descriptive and do not indicate a relative order, location, or identity of elements or features described by the designators. For instance, a "first" shock wave may be immediately succeeded by a "third" shock wave, which is then succeeded by a "second" shock wave. As another example, a "third" emitter may be used to generate a "first" shock wave and vice versa. Accordingly, numerical designators of various elements and features are not intended to limit the disclosure and may be modified and interchanged without departing from the subject invention.

FIG. 1A illustrates an exemplary shock wave catheter system 150 that includes a shock wave catheter 100 configured for imaging and treating an occlusion in a body lumen (e.g., a vessel). The shock wave catheter 100 can include one or more shock wave emitters 102 disposed at a distal portion of the catheter 100 for generating shock waves to treat the occlusion.

The shock wave catheter 100 can include an imaging module 104 disposed at the distal portion of the catheter 100 to image the body lumen before and/or after emitting shock waves from the one or more shock wave emitters 102. The imaging module 104 can include one or more imaging sensors configured for IVUS, OCT imaging, or another similar variant thereof, as described in greater detail below.

The catheter 100 may include at least one elongate tube 106 for supporting the shock wave emitter(s) 102 and/or the imaging module 104. An enclosure 108 may be located at a distal end of the elongate tube 106 and may enclose the shock wave emitter(s) 102 and/or the imaging module 104. The shock wave catheter 100 can include a handle 110 that remains outside of the patient during a procedure. The handle 110 may include at least one port 112 that facilitates connection between the one or more shock wave emitters 102 and a pulse generator 116 and/or facilitates connection between the imaging module 104 and an imaging processor 118. The pulse generator 116 can be a high-voltage source or a laser source. The energy pulses generated by the pulse generator 116 can cause generation of shock waves at the one or more shock wave emitters 102. For example, the pulse generator may generate energy pulses with a frequency between 1 Hz and 5 Hz. The pulse generator may generate energy pulses with a voltage between 0.5 kV and 15 kV.

The imaging processor 118 may be configured to generate imaging data representative of cross-sectional images of the body lumen based on signals generated by the imaging module 104. The imaging processor 118 may be communicatively connected to the imaging module 104 via the same port used by the pulse generator 116 to connect to the shock wave emitter(s) 102 or a different port.

In some examples, the shock wave catheter system 150 may include a controller 114 for controlling shock wave generation and imaging of the body lumen. The controller 114 may be connected via one or more cables to the one or more shock wave emitters 102, the imaging module 104 of the shock wave catheter 100, the imaging processor 118, and/or the pulse generator 116. In some examples, the controller 114 may be integrated with the handle 110.

The imaging processor 118 and the pulse generator 116 may be contained within a single housing 120. Containing these systems within one housing 120 may be advantageous in that the shock wave catheter system 150 may take up less space in a crowded medical room, may require fewer cables, and/or may be easier to use.

The imaging processor 118 may be communicatively coupled to one or more displays 122 for displaying images captured by the imaging module 104. For example, the display 122 may be configured to display cross-sectional images of the body lumen based on signals generated by an imaging sensor of the imaging module 104. The display 122 may display images of the body lumen intraoperatively.

The shock wave catheter 100 may include a guidewire 124 for navigating the shock wave catheter 100 through the body lumen and to the occlusion. The guidewire 124 may be introduced to a corresponding lumen of the shock wave catheter 100 at the handle 110 and may extend through the elongate tube 106 and the enclosure 108 prior to exiting the shock wave catheter 100 at the distal end of the enclosure 108.

In some examples, the shock wave catheter 100 may include one or more fluid lumens 128 for delivering fluid to the enclosure 108 and/or the body lumen. For example, the one or more fluid lumens 128 may include a fluid lumen extending through the elongate tube 106 that can be used for flowing an irrigation solution (e.g., saline or contrast) into the body lumen to temporarily clear blood from the imaging field for OCT imaging.

The handle 110 may include one or more fluid ports 126 coupled to the one or more fluid lumens 128 for delivering fluid to and removing fluid from the shock wave catheter 100. The one or more fluid ports 126 may include a fluid port in fluid communication with the enclosure 108 to fill and remove fluid from the enclosure 108. The shock wave catheter 100 may generate shock waves by first filling the enclosure 108 enclosing the one or more shock wave emitters 102 with a conductive fluid (e.g., water or saline). When a suitable energy pulse is applied to the shock wave emitter 102, an electrical arc can be formed in the conductive fluid within the enclosure 108. The formation of the electrical arc can create a shock wave that propagates outwardly toward the enclosure 108.

Figure 1B:
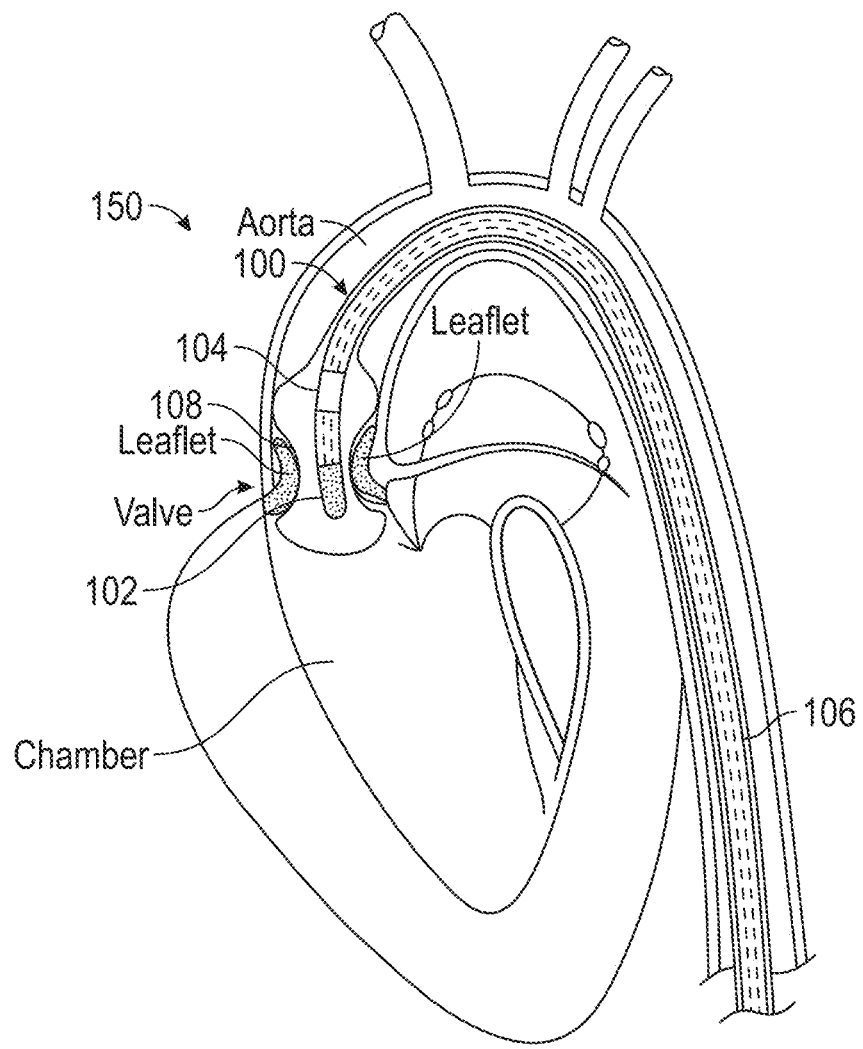
FIG. 1B illustrates the exemplary shock wave catheter system for use in treating an occlusion of a heart valve, according to one or more aspects of the present disclosure.

FIG. 1B illustrates an exemplary use of the shock wave catheter system 150 in which the shock wave catheter 100 can be positioned within an aorta for imaging and shock wave valvuloplasty of the aortic valve. In this example, the leaflets of the aortic valve may become calcified or thickened with fibrotic tissue, thus restricting blood flow from the heart between the leaflets. The shock wave catheter system 150 may be used to modify the calcification and/or fibrotic tissue on and/or proximate to the leaflets by positioning the enclosure 108 at the leaflets and generating one or more shock waves at the at least one shock wave emitter 102. The imaging module 104 may be used to image the aorta and/or the leaflets before and/or after the shock wave valvuloplasty. Although not explicitly illustrated in FIG. 1B, it is to be understood that the shock wave catheter 100 may be advanced to the heart valve using a guidewire extending within the elongate tube 106 of the shock wave catheter 100.

Additional details of exemplary shock wave valvuloplasty catheters that may be included in the shock wave system provided herein are described in greater detail in U.S. Pat. No. 9,044,618, the contents of which are incorporated herein in their entirety. In some examples, the shock wave catheter 100 configured for valvuloplasty can include at least one moveable shock wave emitter 102, as described in greater detail in U.S. Pat. No. 8,574,247, the contents of which are incorporated herein in their entirety. In some examples, the shock wave catheter 100 may include multiple enclosures 108, for example, a first enclosure for positioning distal to the valve leaflets, and a second enclosure for positioning proximal to the valve leaflets. Exemplary shock wave valvuloplasty catheters that include multiple enclosures are described in greater detail in U.S. Pat. No. 9,554,815, the contents of which are incorporated herein in their entirety.

In general, the imaging module 104 and the shock wave emitter 102 are spaced apart in a longitudinal direction of the catheter 100. For example, the imaging module 104 may be spaced proximally from the shock wave emitter 102. FIG. 2 illustrates a diagram of an exemplary shock wave catheter 200 that includes a shock wave emitter 202 configured to generate shock waves that propagate distally (as indicated by the arrows extending from the shock wave emitter 202) and an imaging module 204 spaced proximally from the shock wave emitter 202. The shock wave catheter 200 can be used for shock wave catheter 100 in shock wave catheter system 150.

It may be advantageous to position the imaging module 204 proximally of the distally emitted shock wave emitter 202 to prevent the distally propagating shock waves from damaging the imaging module 204 (i.e., the imaging sensor of the imaging module 204).

In some examples, the imaging module 204 (e.g., an imaging sensor of the imaging module 204) may be spaced apart from the shock wave emitter 202 such that the shock waves generated by the shock wave emitter 202 do not damage the imaging module 204 during an functional lifespan (e.g., a single procedure for a single use variation of shock wave catheter 200 or a predefined number of procedures for a reusable variation of shock wave catheter 200) of the shock wave catheter 200 to an extent that affects the quality of imaging by the imaging module 204.

The imaging module 204 may be moveable relative to the elongate tube 206 for generating a cross-sectional image of the body lumen. For example, the imaging module 204 may be rotatable about a longitudinal axis 208 of the elongate tube 206. Additionally or alternatively, the imaging module 204 may be translatable about a longitudinal axis 208 of the elongate tube 206. Rotatability and translatability of the imaging module 204 are depicted by the arrows positioned relative to the imaging module 204 in FIG. 2.

Imaging modules as disclosed herein may be rotated or translated by manual translation of an articulating element of the overall system mechanically coupled to the imaging module, where the articulating element is in part outside the patient and controlled by an operator. Alternatively, the imaging module may be rotated or translated by a motor mechanically coupled to the imaging module, where the motor is a part of the overall system and outside the patient, and where the motor can be selectively operated to rotate according to input commands, automatically according to a programmed sequence, or a combination thereof. In further alternative implementations, an imaging module may be constructed from an array of imaging elements that are not connected to rotation or translating structures. The array of imaging elements can be positioned around the circumference of the catheter (e.g. four elements positioned at 0°, 90°, 180°, and 270° locations around the main catheter body or lumen, six elements positioned at 0°, 60°, 120°, 180°, 240°, and 300° locations around the main catheter body or lumen, etc.) such that the image data collected from all of the array of imaging elements can be combined to provide a complete panoramic or circumferential view of a target region of the vasculature.

In some examples, the imaging module 204 may be moved using a moveable member 210 that extends within or along at least a portion of the elongate tube 206. The imaging module 204 (e.g., the imaging sensor of the imaging module 204) may be disposed on the moveable member 210 to move the imaging module 204 relative to the elongate tube 206. In some examples, as illustrated in FIG. 2, the imaging module may be disposed at a distal end of the moveable member 210.

Returning to FIG. 1A, in some examples, the imaging module 104 may be spaced distally from the shock wave emitter 102. FIG. 3 illustrates a diagram of an exemplary shock wave catheter 300 that includes an imaging module 304 disposed distally of the shock wave emitter 302. The shock wave catheter 300 can be used for shock wave catheter 100 in shock wave catheter system 150.

The imaging module 304 may be disposed distally of the imaging module 304 to enable the imaging module 304 to capture images of the body lumen from the distal tip of the shock wave catheter 300. This positioning of the imaging module 304 may be particularly advantageous for increasing the imaging field of view of the imaging module 304.

In this example, the shock wave emitter 302 may be configured to emit shock waves in a primarily or exclusively outward (e.g., radial) direction to avoid the shock waves propagating distally and damaging the imaging module 204. In some examples, the shock wave catheter 300 may include a barrier element 310 to protect the imaging module 304 (e.g., an imaging sensor of the imaging module 304) from the shock waves emitted by the shock wave emitter 302. The barrier element 310 may be disposed between the imaging module 304 and the shock wave emitter 302. The barrier element 310 may be configured or formed of a material adapted to block the shock waves emitted by the shock wave emitter 302, for example, by absorbing or reflecting the shock waves. In some examples, the barrier element 310 divides the enclosure 308 surrounding the imaging module 304 and the shock wave emitter 302, i.e., the barrier element 310 creates two substantially separate enclosures for enclosing the shock wave emitter 302 and the imaging module 304. Having a barrier element 310 between the shock wave emitter 302 and the imaging module 304 may be particularly useful in embodiments in which the imaging module 304 is configured for IVUS imaging. This can be because, as described below, both the shock wave emitter 302 and the imaging module 304 generate and emit acoustic energy that the other system may be susceptible to damage from.

Figure 4A:
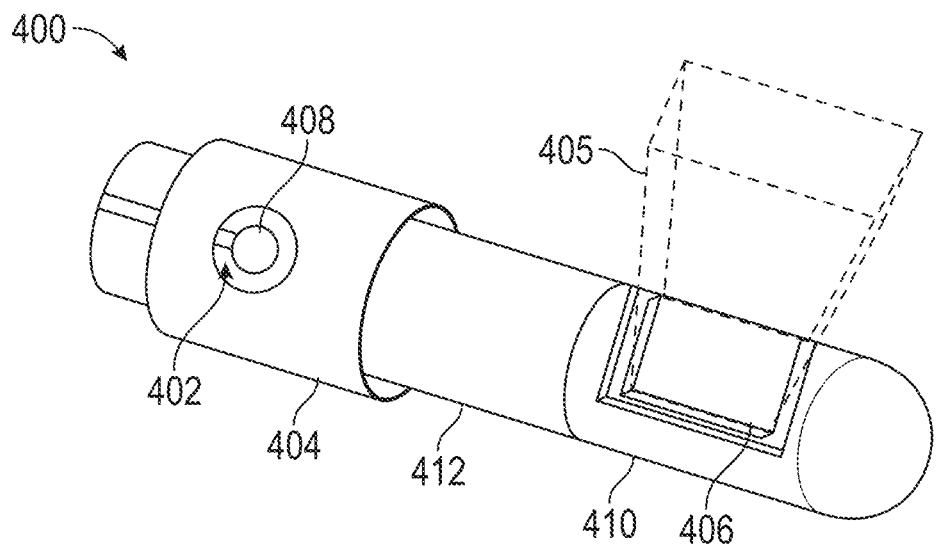
FIG. 4A illustrates a diagram of an exemplary intravascular ultrasound catheter system having a single ultrasound transducer, according to one or more aspects of the present disclosure.
Figure 4B:
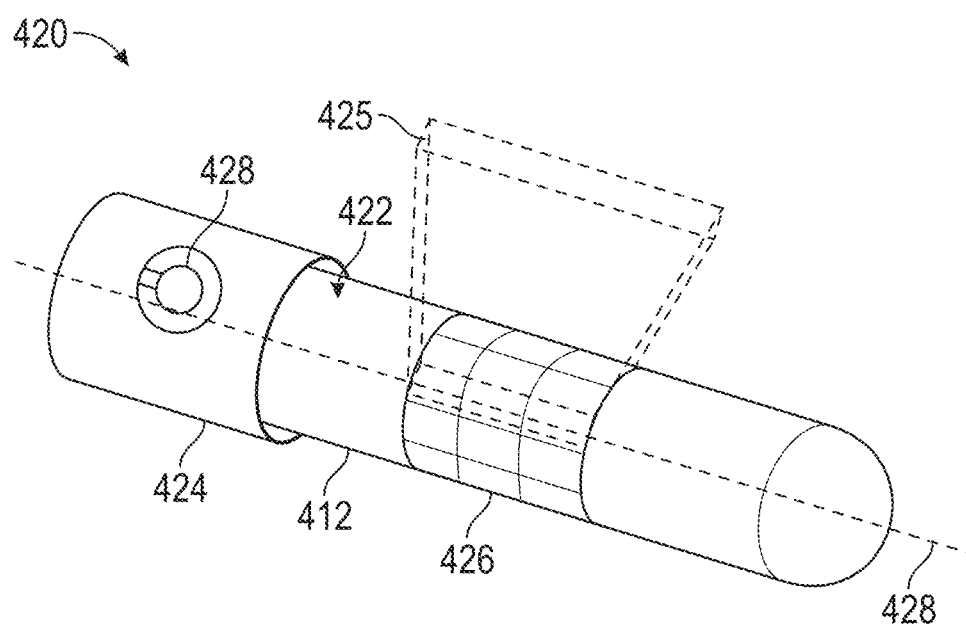
FIG. 4B illustrates a diagram of an exemplary intravascular ultrasound catheter system having an ultrasound transducer array, according to one or more aspects of the present disclosure.

As noted above, the imaging module 104 can include at least one imaging sensor configured for intravascular ultrasound (IVUS). FIGS. 4A-4B illustrate exemplary shock wave catheter systems 400, 420 (respectively) having IVUS systems integrated therein that may be used for the shock wave catheter system 150 described herein. Integrating an IVUS system with an IVL system such as shock wave catheter system 150 may be a particular challenge because both the shock wave emitters for IVL and the ultrasound transducer(s) for IVUS emit acoustic energy that could affect the functionality of the other system. For example, the ultrasound transducer(s) may be highly sensitive and thus vulnerable to damage by the shock waves generated by the shock wave emitter(s). Additionally or alternatively, signal processing may be challenging due to the electrical interference with the radiofrequency (RF) signals that are processed to create the images. Accordingly, in either scenario, careful design consideration in light of these challenges has been taken to successfully integrate the two systems together to one catheter-based system.

FIG. 4A illustrates an exemplary shock wave catheter system 400 that includes at least one shock wave emitter 402 configured to emit shock waves and a single ultrasound transducer 406 configured to generate and receive ultrasound waves 405. In this example, the at least one shock wave emitter 402 includes a conductive sheath 404 and a conductor 408, although other variations of shock wave emitters as described herein may be used for the shock wave emitter 402. When energy (e.g., voltage) is delivered to the conductor 408, electrical current can transmit from the end of the conductor 408 across a spark gap between the conductor 408 and the conductive sheath 404, in turn generating a shock wave at the at least one shock wave emitter 402.

The ultrasound transducer 406 may include a piezoelectric transducer. The ultrasound transducer 406 may be contained within a moveable member 410 at a distal end of an elongated tube 412. The moveable member 410 may be configured to rotate the ultrasound transducer 406 during imaging to obtain a full cross-sectional or circumferential image of the body lumen. Additionally or alternatively, the moveable member 410 may be configured to translate the ultrasound transducer 406 during imaging to obtain a longitudinal series of images of the body lumen.

FIG. 4B illustrates an exemplary shock wave catheter system 420 that includes at least one shock wave emitter 422 configured to emit shock waves and an ultrasound transducer array 426 configured to generate and receive ultrasound waves 425. Similar to FIG. 4A, in this example, the shock wave emitter 422 includes a conductive sheath 424 and a conductor 428, although variations of shock wave emitters as described herein may be used for the shock wave emitter 422. When energy (e.g., voltage) is delivered to the conductor 428, electrical current can transmit from the end of the conductor 428 across a spark gap between the conductor 428 and the conductive sheath 424, in turn generating a shock wave at the at least one shock wave emitter 422.

The ultrasound transducer array 426 can include a plurality of ultrasound transducers disposed circumferentially around a longitudinal axis 428 of the elongate tube 412). For example, the ultrasound transducer array 426 can include between 3-72, 6-64, 12-48, or 24-36 ultrasound transducers. The transducers of the ultrasound transducer array 426 can be sequentially activated with different time delays to produce an ultrasound beam that sweeps around the circumference of the body lumen during imaging. In this manner, the shock wave catheter system 420 may not require the ultrasound transducer array to be rotated. In some examples, the shock wave catheter system 420 may include a similar moveable member described above with respect to FIG. 4A to translate the ultrasound transducer array 426 during imaging to produce a longitudinal series of images. In other examples, the shock wave catheter system 420 may be a solid-state system in which the ultrasound transducer array 426 is not moved. Various implementations of the ultrasound transducer array 426 can include having transducers positioned around the circumference of the catheter equally or asymmetrically—in other words, positioned at locations from 0° to 360° around the main catheter body or lumen—such that the data collected from all of the transducer elements can be combined to provide a complete panoramic or circumferential image of a target region of the vasculature. Additional details of the ultrasound transducer 406 (e.g., both the single transducer 406 and the transducer array 426) are described in greater detail below with respect to IVUS system 800 shown in FIG. 8.

Referring again to FIG. 1A, the shock wave emitter 102 and/or the imaging module 104 may be supported by the elongate tube 106 of the shock wave catheter 100. FIG. 5A illustrates a cross-sectional view along a longitudinal axis 501 of an exemplary shock wave catheter 500 in which each of the one or more shock wave emitters 502 and the imaging module 504 are disposed along the outside of elongate tube 506. The shock wave catheter 500 can be used for shock wave catheter 100 in shock wave catheter system 150.

The one or more shock wave emitters 502 may include a conductive sheath 510 that at least partially surrounds the end of one or more conductors 512. The one or more conductors 512 can extend along the outside of the elongate tube 506, such that the conductive sheath 510 at least partially surrounds a portion of the elongate tube 506 in surrounding the end of the one or more conductors 512. Shock wave catheter 500 may include two conductors 512 and a conductive sheath 510. A first shock wave emitter of the one or more shock wave emitters 502 may be formed by the distal end of a first conductor of the one or more conductors 512 and the conductive sheath 510, and a second shock wave emitter of the one or more shock wave emitters 502 may be formed by the distal end of a second conductor of the one or more conductors 512 and the conductive sheath 510. In this example, the conductive sheath 510 can form one electrode of an electrode pair, whereas the distal end of a conductor of the one or more conductor 512 can form the other electrode of the electrode pair.

In some examples, catheter 500 may include a shock wave emitter formed by the ends of conductors that are spaced apart by a gap. The two conductors may extend within or along an outside of the elongate tube. The distal end of each conductor may form an electrode of the electrode pair. Additional shock wave emitter arrangements that may be embodied by the shock wave catheter 500 are described in greater detail in U.S. Pat. No. 10,966,737 and U.S. patent application Ser. Nos. 17/021,905, 17/537,325, and 18/137,815, the contents of each of which have been incorporated herein by reference in its entirety.

The imaging module 504 may be mounted on a sheath 514 that at least partially surrounds the elongate tube 506. The imaging module 504 may be coupled to a wire 516 for transmitting imaging signals from the imaging module 504 to an external imaging processor (e.g., imaging processor 118 of shock wave catheter system 150). The wire 516, like conductors 512, may be disposed along the outside of the elongate tube 506.

Figure 5B:
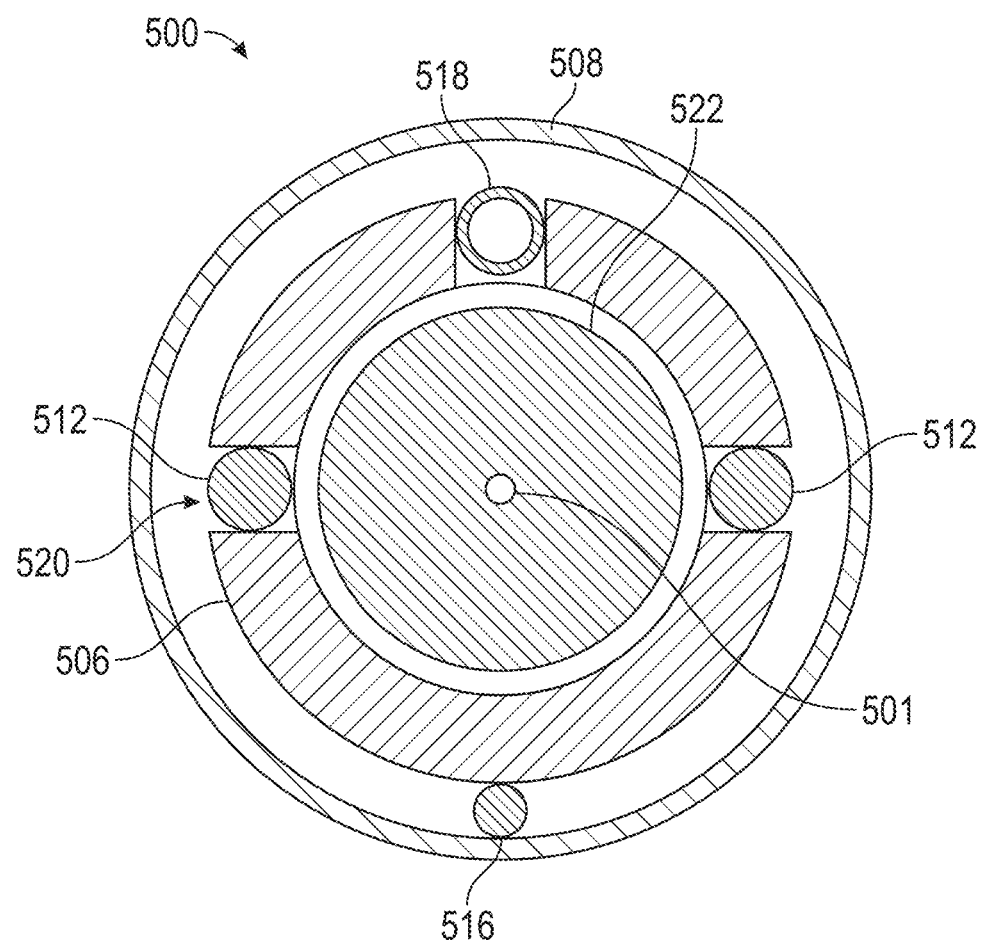
FIG. 5B illustrates a cross-sectional view of the exemplary shock wave catheter along line B-B in FIG. 5A, according to one or more aspects of the present disclosure.

FIG. 5B is a cross-sectional view of catheter 500 along a plane that is perpendicular to the longitudinal axis 501 and illustrates an exemplary arrangement of various wires and lumens of the shock wave catheter 500 relative to the elongate tube 506. As depicted in FIG. 5B, the elongate tube 506 may include one or more grooves 520 within which the conductors 512 can be disposed. In this example, the wire 516 coupled to the imaging module 504 is not depicted in a groove of the elongate tube 506. However, it is to be understood that any reasonable arrangement of the wires or lumens of the shock wave catheter 500 is intended to be encompassed by this disclosure.

The shock wave catheter 500 can be configured to receive a guidewire 522 that extends within the elongate tube 506 and exits at the distal end of the shock wave catheter 500. In some examples, in addition to or instead of the elongate tube 506 being configured to receive a guidewire, the elongate tube 506 may include a fluid lumen for delivering fluid from the distal end of the shock wave catheter 500 and to the body lumen. This fluid may be used, for example, to clear blood or other fluids that can obstruct the view of an imaging sensor, e.g., an OCT imaging sensor.

In some examples, the shock wave catheter 500 can include a fluid tube 518 for filling the enclosure 508 with fluid that facilitates shock wave generation by the one or more shock wave emitters 502. The fluid tube 518 may be disposed within a groove 520 of the elongate tube 506. The fluid tube 518 can fluidly connect to the inner area of the enclosure 508 to fill and remove fluid from the enclosure 508.

In some implementations, the material that forms the primary surface(s) of the enclosure 508 through which shock waves pass can be a noncompliant polymer. In other implementations, a rigid and inflexible structure may be used in lieu of enclosure 508. The enclosure 508 may mitigate thermal injury to soft tissue and reduce cavitation stresses by limiting expansion of the vapor bubbles produced during shock wave generation to the interior of the enclosure 508. For instance, the vapor bubbles hit the enclosure wall before reaching their maximum potential size, thus inducing collapse, and reducing cavitation stress and preventing soft tissue injury that can be caused by tensile stresses during cavitation bubble collapse.

Referring again to FIG. 1A, the imaging module 104 may be moveable relative to the elongate tube 106. In some examples, in addition to or instead of the imaging module 104 being moveable relative to the elongate tube 106, the one or more shock wave emitters 102 may be moveable relative to the elongate tube 106. FIGS. 6A-6B illustrate aspects of an exemplary shock wave catheter 600 in which one or more shock wave emitters 602 and an imaging module 604 are moveable relative to an elongate tube 606. The shock wave catheter 600 can be used for shock wave catheter 100 in shock wave catheter system 150.

The one or more shock wave emitters 602 and the imaging module 604 can be mounted along a moveable member 612 extending from within the elongate tube 606 and into the enclosure 608. The moveable member 612 may be disposed along an inner elongated member 610 that extends from within the elongate tube 606 into the enclosure 608. The one or more shock wave emitters 602 and the imaging module 604 can be moved from the location depicted in FIG. 6A to the location depicted in FIG. 6B by extending a portion of the moveable member 612 from within the elongate tube 606 and into the enclosure 608 along the inner elongate member 610.

Figure 6C:
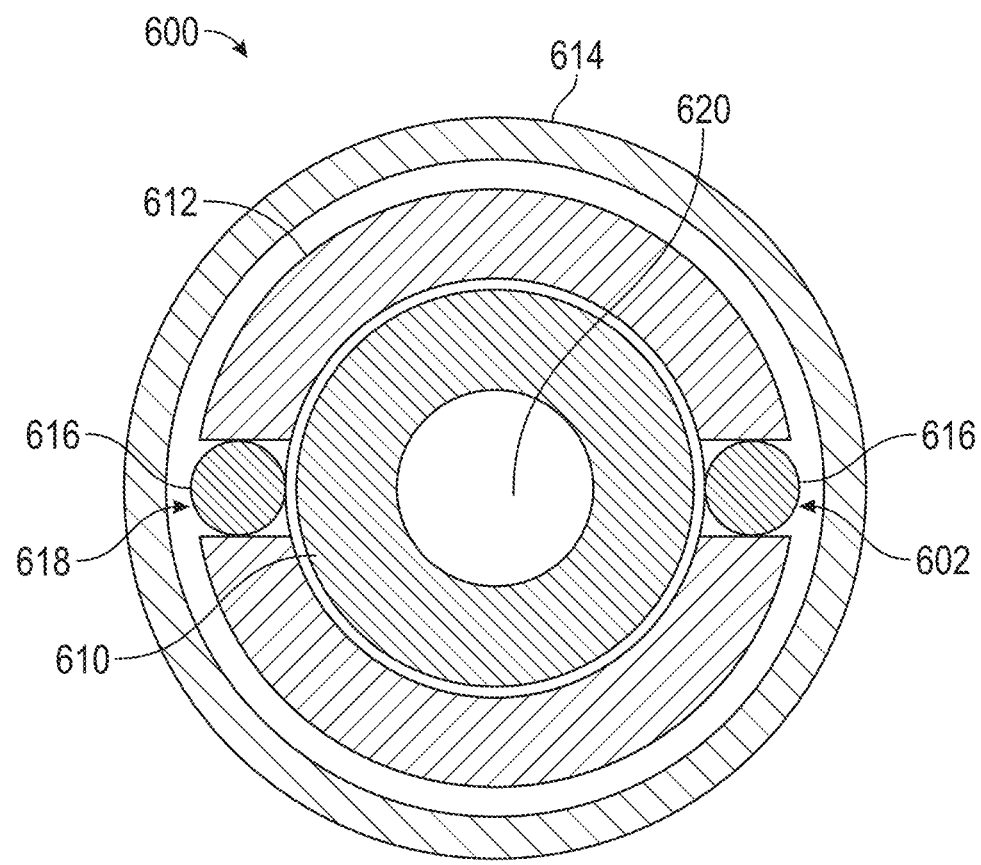
FIG. 6C illustrates a cross-sectional view of the exemplary shock wave catheter along line C-C in FIG. 6B, according to one or more aspects of the present disclosure.

The orientation of the moveable member 612 relative to the inner elongate member 610 is further depicted in the cross-sectional view of shock wave catheter 600 through the shock wave emitter 602 in FIG. 6C. As shown in FIG. 6B, the shock wave emitter 602 may be composed of a conductive sheath 614 and one or more conductors 616. The one or more conductors 616 may be disposed along the inner elongate member 610, for example, in one or more grooves 618 of the moveable member 612.

In the example shown in FIG. 6C, the inner elongate member 610 includes a lumen 620. In some examples, the lumen 620 may be configured to receive a guidewire. In some examples, the lumen 620 may additionally or alternatively be configured to deliver fluid to the body lumen. Each of these types of lumens is described in greater detail above.

Although FIGS. 6A-6C describe the one or more shock wave emitters 602 and the imaging module 604 as being moveable together (via the moveable member 612), it is to be understood that variations of this condition can exist. For example, an imaging module may be positioned along a moveable member (e.g., similar to moveable member 612), whereas one or more shock wave emitters can be positioned along an elongate member (e.g., similar to elongate member 610) that is fixed relative to the moveable member. In this example, the imaging module can be moveable and the one or more shock wave emitters can remain fixed. Alternatively, one or more shock wave emitters may be positioned along a moveable member (e.g., similar to moveable member 612), whereas an imaging module can be positioned along an elongate member (e.g., similar to elongate member 610) that is fixed relative to the moveable member. In this example, imaging module 604 can remain fixed and the one or more shock wave emitters can be moveable. Additional details regarding moveable shock wave emitters are described in U.S. Pat. No. 11,020,135 and U.S. patent application Ser. No. 18/428,752, the contents of each of which are incorporated herein by reference in their entirety.

Figure 7:
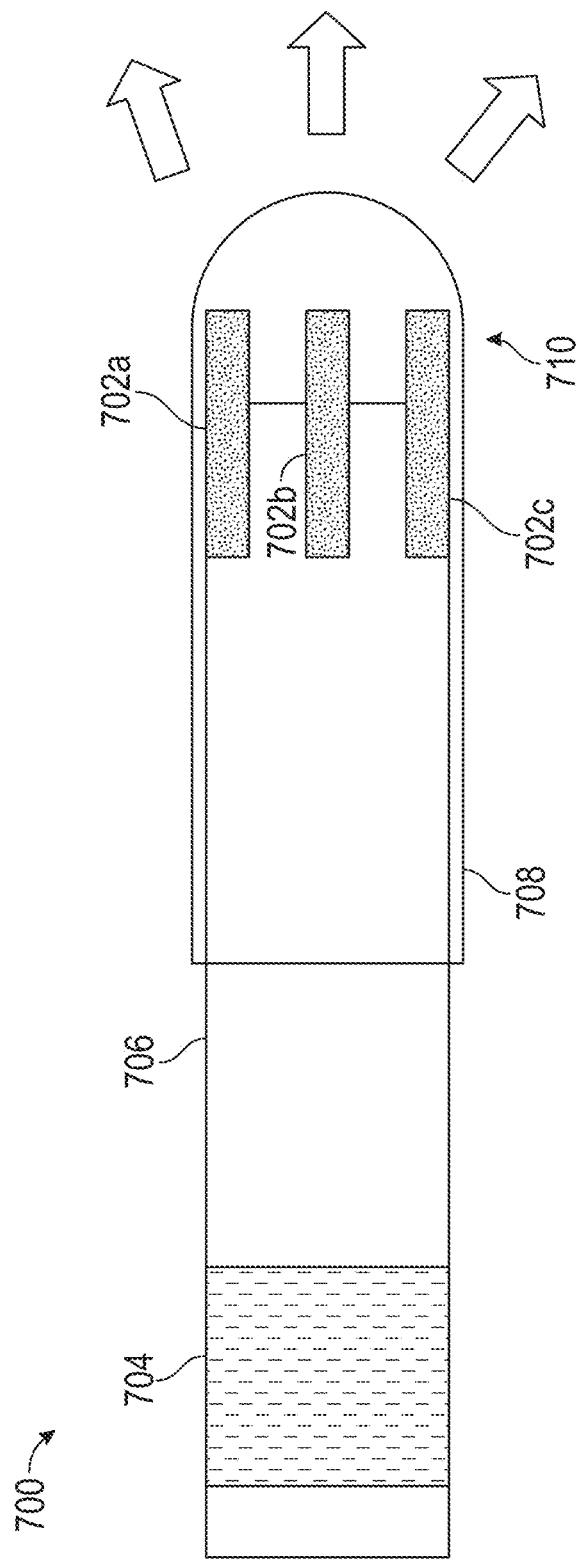
FIG. 7 illustrates a diagram of an exemplary shock wave catheter having a plurality of distally firing shock wave emitters and an imaging module disposed proximal of the plurality of shock wave emitters, according to one or more aspects of the present disclosure.

As mentioned above, the one or more shock wave emitters 102 of the shock wave catheter 100 may be configured to emit shock waves in a distal direction. FIG. 7 depicts a diagram of an exemplary shock wave catheter 700 that includes a plurality of shock wave emitters 702a, 702b, and 702c (i.e., shock wave emitters 702a-c), each of which is configured to emit shock waves in a distal direction. Shock wave catheter 700 can be used for shock wave catheter 100 in shock wave catheter system 150.

The shock wave emitters 702a-c may be disposed at a distal end 710 of the elongate tube 706 to emit shock waves in a distal direction from the shock wave catheter 700. The direction of the shock waves is represented by the arrows illustrated proximate to the distal end 701 of the elongate tube 706. The shock waves generated by each of the shock wave emitters 702a-c may constructively interfere distally of the elongate tube 706.

Each of the shock wave emitters 702a-c may be supported by the elongate tube 706. The imaging module 704 may be disposed proximally of the shock wave emitters 702a-c. Similar to the earlier described shock wave catheters, the shock wave catheter 700 can include an enclosure 708 for enclosing the plurality of shock wave emitters 702a-c and the imaging module 704. Shock wave catheters having a plurality of shock wave emitters configured to emit shock waves in a distal direction from the shock wave catheter are described in greater detail in U.S. patent application Ser. No. 18/524,575, the contents of which are incorporated herein in their entirety.

Figure 8:
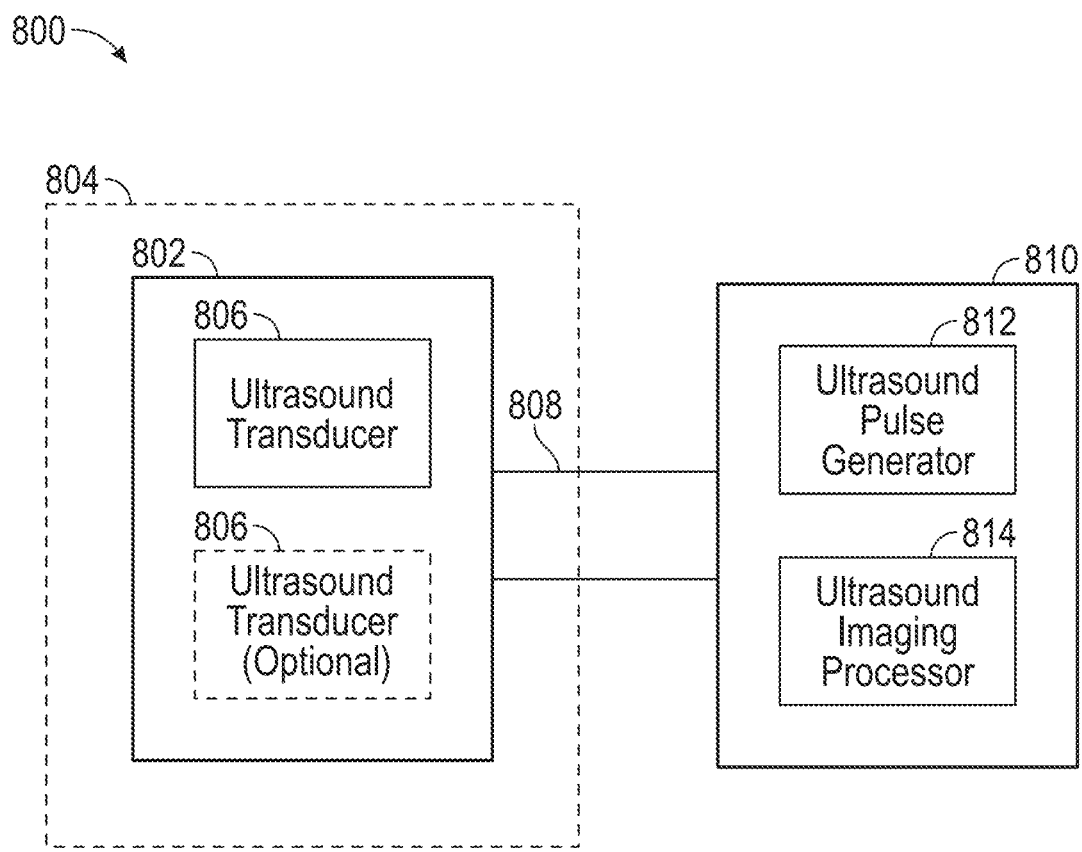
FIG. 8 illustrates a block diagram of an exemplary shock wave catheter system integrated with an intravascular ultrasound (IVUS) system, according to one or more aspects of the present disclosure.

FIG. 8 depicts a block diagram of an IVUS system 800 that can be used in the shock wave catheter system 150. For example, the IVUS system 800 can include an IVUS imaging module 802 integrated to a shock wave catheter 804 that can be used for shock wave catheter 100 (i.e., the IVUS imaging module 802 may be the imaging module 104), and an external IVUS module 810 that can be used for the imaging processor 118. Variations of IVUS that can be incorporated herein can include high-definition IVUS (HD-IVUS) and IVUS with virtual histology (VH-IVUS). Each of the IVUS imaging module 802 and the external IVUS module 810 is described in greater detail below.

The IVUS imaging module 802 can include one or more ultrasound transducers 806. The ultrasound transducer 806 is understood to be exemplary of the at least one imaging sensor mentioned above with respect to the imaging module. The ultrasound transducer 806 is configured to generate and receive ultrasound waves. In some examples, the ultrasound transducer 806 can include piezoelectric crystal(s) that convert electrical signals into ultrasound waves received from an ultrasound pulse generator 812. When an electrical signal is applied to the ultrasound transducer 806, the crystals vibrate and produce ultrasound waves. When the crystals receive ultrasound echoes from the tissue, they convert the mechanical vibrations back into electrical signals that can be transmitted to the ultrasound imaging processor 814.

In some examples, the IVUS imaging module 802 includes a plurality of ultrasound transducers 806, as illustrated by the additional (optional) ultrasound transducer 806 in FIG. 8. For example, the IVUS imaging module 802 may comprise a first ultrasound transducer configured to generate and emit ultrasound waves and a second ultrasound transducer configured to receive ultrasound echoes and transmit an electrical signal to the ultrasound imaging processor 814 based on the echoes.

In some examples, the one or more ultrasound transducers 806 include a single rotatable transducer. The ultrasound transducer 806 may be rotatable to create a 360-degree image of the body lumen. Alternatively, the one or more ultrasound transducers 806 can include a plurality of ultrasound transducers 806. For example, the plurality of ultrasound transducers 806 may be arranged circumferentially around a longitudinal axis of the elongate tube. In some examples, the plurality of ultrasound transducers 806 includes an array of transducers. In either example, the plurality of ultrasound transducers 806 may be configured to capture images without the need for rotation. In any of the aforementioned examples, the one or more ultrasound transducers 806 may be moveable by translating the ultrasound transducer 806 relative to the catheter 804. For example, the one or more ultrasound transducers 806 may be pulled back relative to the shock wave catheter 804 to acquire a longitudinal series of images. In some examples, the ultrasound transducer 806 may be fixed.

Electrical signals may be transmitted between the at least one ultrasound transducer 806 and the external IVUS module 810 (i.e., the ultrasound pulse generator 812 and the ultrasound imaging processor 814) via one or more conductors 808 that couple these components together. The conductors 808 may extend at least partially within or along the catheter 804.

The external IVUS module 810 can include an ultrasound pulse generator 812 and an ultrasound imaging processor 814. As mentioned above, the ultrasound pulse generator 812 can send ultrasound pulses in the form of electrical signals to the ultrasound transducer 806 to generate ultrasound waves. In some examples, the ultrasound pulse generator 812 generates ultrasound pulses having a frequency between 5 and 60 MHz. In some examples, the ultrasound pulse generator 812 includes a receiver configured to receive and amplify the returning echoes from the ultrasound transducer 806. The receiver can measure acoustic RF signals, which may be beamformed for m-mode, b-mode, elastography, or another type of ultrasound imaging and/or tissue characterization technique. In some examples, the ultrasound pulse generator 812 is the same pulse generator used for generating energy pulses for shock wave generation. In some examples, the ultrasound pulse generator 812 and the pulse generator for shock wave generation are different.

The ultrasound imaging processor 814 can be configured to process electrical signals from the ultrasound transducer 806 to produce ultrasound imaging data of the body lumen. The ultrasound imaging data can be transmitted to a display (e.g., display 122 of shock wave catheter system 150) for displaying ultrasound images of the body lumen. As noted above, the ultrasound images can be cross-sectional images of the body lumen.

Figure 9:
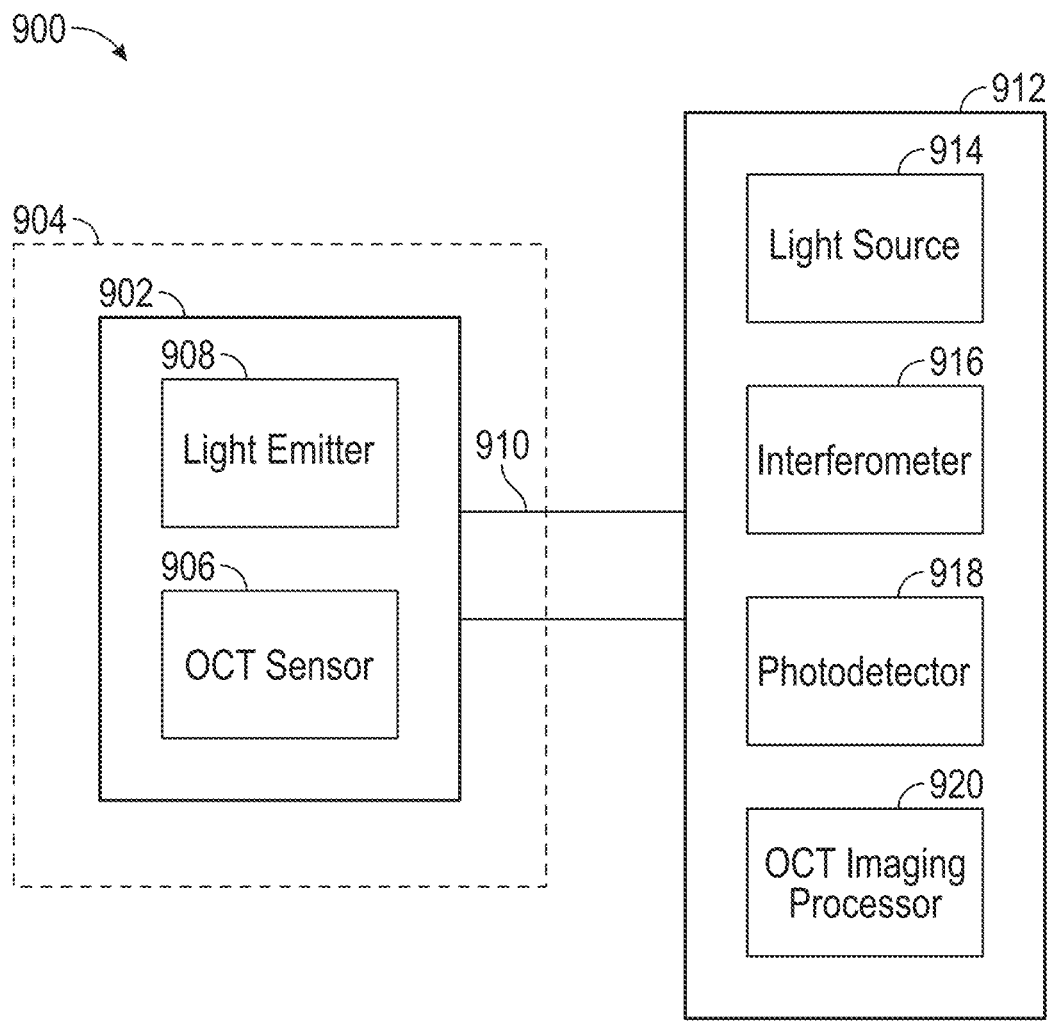
FIG. 9 illustrates a block diagram of an exemplary shock wave catheter system integrated with an optical coherence tomography (OCT) system, according to one or more aspects of the present disclosure.

FIG. 9 depicts a block diagram of an OCT system 900 that can be used in the shock wave catheter system 150. For example, the OCT system 900 can include an OCT imaging module 902 integrated to a shock wave catheter 904 that can be used for shock wave catheter 100 (e.g., the OCT imaging module 902 can be imaging module 104) and an external OCT module 912 that can be used for the imaging processor 118. The OCT system may in some examples be a micro-OCT system. μ-OCT can have higher resolution than standard OCT but a more limited field of view. Other variations of OCT that may be incorporated in the OCT systems described herein may include but are not limited to swept-source OCT (SS-OCT) and OCT angiography (OCTA). Each of the OCT imaging module 902 and the external OCT module 912 is described in greater detail below.

The OCT imaging module 902 can include one or more OCT sensors 906. The OCT sensor 906 is understood to be exemplary of the at least one imaging sensor mentioned above with respect to the imaging module. In some examples, the OCT imaging module 902 can include an optical assembly configured to direct light generated by one or more light emitters 908 outward to the body lumen and collect the reflected light. For example, the optical assembly may include one or more lenses and mirrors. The light emitter 908 may be composed of an end of an optical fiber (e.g., optical fiber 910) that is coupled to a light source 914, such as a laser or broadband light source configured to emit near-infrared light waves.

In some examples, the OCT sensor 906 may be rotatable. The OCT sensor 906 may be rotatable to direct the light emitted by the light emitter 908 in a circular pattern, allowing for a 360-degree scan of the body lumen. Additionally or alternatively, the OCT sensor 906 may be translatable. For example, the OCT sensor 906 may be pulled back relative to the shock wave catheter 904 to acquire a longitudinal series of images. In some examples, the OCT sensor 906 may be fixed.

Light may be transmitted between the OCT imaging module 902 and the external OCT module 912 via one or more optical fibers 910 that couple these components together. The optical fiber 910 may extend at least partially within or along the shock wave catheter 904.

The external OCT module 912 may include at least a light source 914, an interferometer 916, a photodetector 918, and an OCT imaging processor 920. As mentioned above, the light source 914 may be a laser or broadband light source configured to generate near-infrared light. The interferometer 916 can be configured to split the light generated by the light source 914 into two paths: one path going to the OCT sensor 906, and the other remaining within the interferometer 916 as a reference. The interferometer can be configured to measure the time delay and intensity of the light waves reflected by the OCT sensor 906 and generate an interference pattern based thereon. The photodetector 918 can be configured to detect the interference pattern from the interferometer 916 and convert it to electrical signals. The OCT imaging processor 920 can be configured to process the electrical signals from the photodetector 918 to generate OCT imaging data.

The OCT imaging data can be transmitted to a display (e.g., display 122 of shock wave catheter system 150) for displaying OCT images of the body lumen. As noted above, the OCT images can be cross-sectional images of the body lumen.

Figure 10:
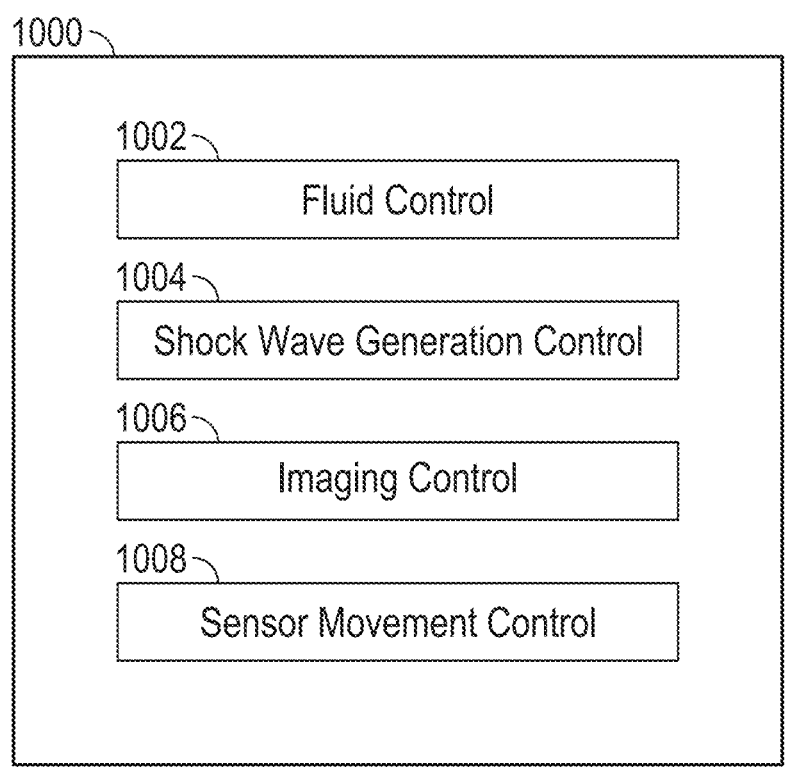
FIG. 10 illustrates a block diagram of an exemplary controller of the shock wave catheter system, according to one or more aspects of the present disclosure.

As noted previously with respect to FIG. 1, the shock wave catheter system 150 can include a controller (e.g., controller 114) for controlling shock wave generation and imaging of the body lumen. FIG. 10 illustrates a block diagram of an exemplary controller 1000 that can be used for controller 114 of shock wave catheter system 150 to control shock wave generation and to image the body lumen.

The controller 1000 may include a user interface, such as a touch screen, buttons, switches, knobs, keypad, etc., for controlling various functionalities of the shock wave catheter system described herein. For example, controller 1000 includes controls for fluid (1002), shock wave generation (1004), imaging (1006), and sensor movement (1008). Each of these controls is described below.

Fluid control 1002 can be configured for controlling the introduction and removal of fluid from the shock wave catheter, for example, for filling the enclosure of the shock wave catheter prior to generating shock waves. In some examples, the fluid control 1002 can be configured for controlling the introduction of fluid through a fluid lumen of the shock wave catheter that exits the shock wave catheter at a distal end of the catheter for clearing blood from the body lumen prior to imaging. In some examples, the controller 1000 includes fluid controls 1002 for both of the aforementioned configurations. In this example, the controls could be the same set of controls or two different sets of controls.

Shock wave generation control 1004 can be configured for controlling shock wave generation by the shock wave catheter. For example, shock wave generation control 1004 can include one or more controls for adjusting parameter(s) of the energy pulses delivered by the pulse generator to the one or more shock wave emitters of the shock wave catheter. Parameters can include, but are not limited to, a frequency, amplitude, pulse width, and a duty cycle of the energy pulses. In some examples, the shock wave generation control 1004 includes at least one control for starting and pausing or stopping the delivery of shock waves.

Imaging control 1006 can be configured for adjusting one or more imaging parameters to optimize the quality of the images produced. Imaging parameters can include, but are not limited to, resolution, contrast, brightness, gain, depth of field, field of view, acquisition time, and focus. In some examples, imaging control 1006 can be configured for adjusting an imaging mode between, for example, doppler, b-mode, m-mode, elastography, etc. In some examples, the imaging module of the shock wave catheter system may continuously capture images of the body lumen during the interventional procedure. In some examples, the imaging module may intermittently capture images, e.g., in accordance with a predefined frequency for imaging, or in accordance with an indication by a user of the system. In accordance with the latter example, the imaging control 1006 may include at least one control for starting and stopping the capturing of an image or series of images.

Sensor movement control 1008 can be configured for controlling the movement of the imaging module, i.e., the sensor of the imaging module. For example, as described herein, the imaging module may be moveable by rotating and/or translating the imaging module relative to the elongate tube of the shock wave catheter. Accordingly, the sensor movement control 1008 can be used to control this movement. An example of this movement can be for imaging the body lumen. OCT and IVUS imaging systems can be configured such that the imaging module of said systems can be pulled back and/or rotated during imaging to obtain a longitudinal and/or rotational series of images of the body lumen.

Figure 11A:
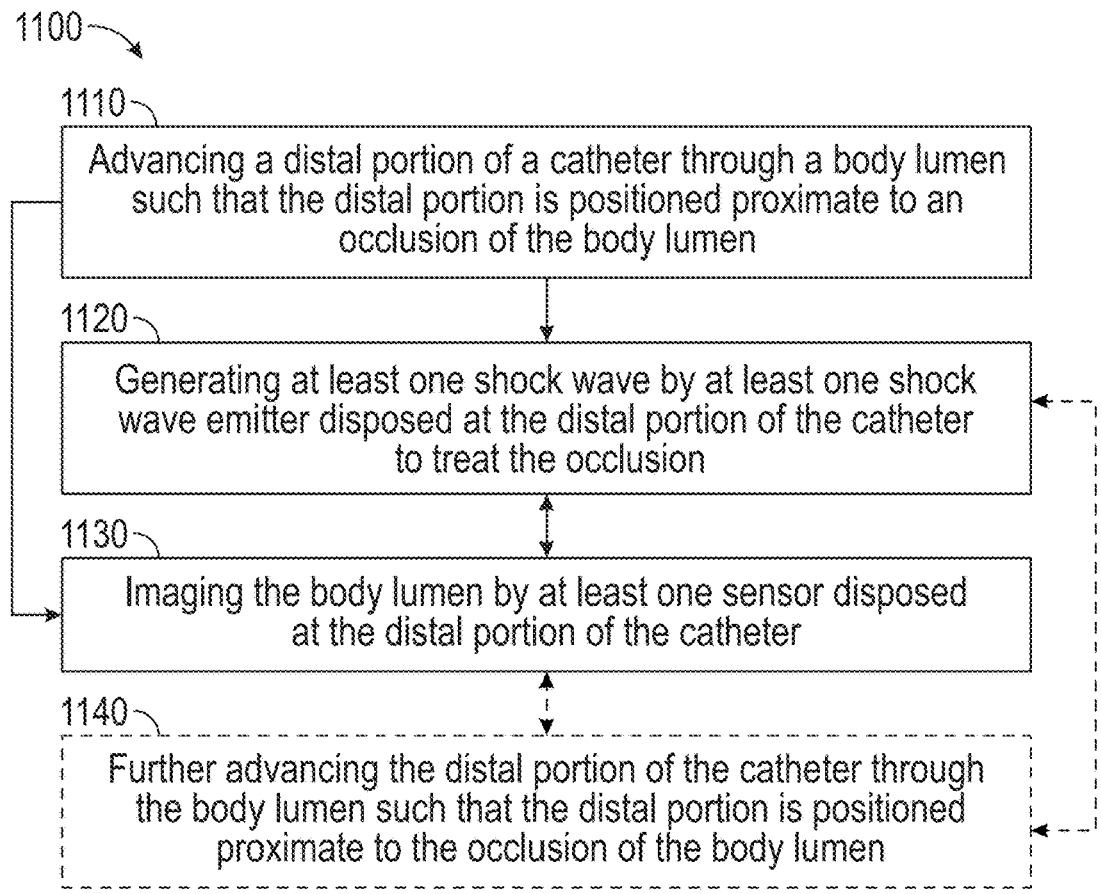
FIG. 11A illustrates an exemplary method for imaging a body lumen and treating an occlusion of the body lumen, according to one or more aspects of the present disclosure.

FIG. 11A illustrates an exemplary method 1100 for imaging a body lumen of a subject and treating an occlusion of the body lumen. At block 1110, the method can include advancing a distal portion of the shock wave catheter through the body lumen such that the distal portion of the shock wave catheter is positioned proximate to the occlusion of the body lumen. In some examples, advancing the distal portion of the shock wave catheter may include advancing the shock wave catheter over a guidewire extending through the body lumen.

In some examples, the body lumen can be of the subject's peripheral vasculature, such as a below-the-knee vessel of the subject. In some examples, the body lumen can be of the subject's coronary vasculature, including the aorta. In some examples, the body lumen of the coronary vasculature can include a heart valve, such as the aortic valve.

At block 1120, the method can include generating one or more shock waves by at least one shock wave emitter of the shock wave catheter that can be disposed at the distal portion of the shock wave catheter to treat the occlusion. In some examples, the shock waves are emitted in a distal direction. In some examples, the method includes delivering energy pulses (e.g., one or more laser pulses or voltage pulses) to the at least one shock wave emitter to cause the shock wave emitter to generate the shock waves. In the example in which voltage pulses are delivered to the at least one shock wave emitter, the voltage pulses may have a voltage between 0.5 and 15 kV.

At block 1130, the method can include imaging the body lumen by at least one sensor of an imaging module that can be disposed at the distal portion of the catheter. In some examples, the imaging can be IVUS using one or more ultrasound transducers. In some examples, the imaging can be OCT using one or more OCT sensors. In the latter example, the method may comprise activating a light emitter of the catheter that can be disposed at the distal portion of the catheter to illuminate the body lumen for OCT imaging.

In some examples, imaging the body lumen at block 1130 can include moving the at least one sensor of the imaging module relative to the catheter. For example, moving the at least one sensor can include rotating the at least one sensor about a longitudinal axis of the catheter. Additionally or alternatively, moving the at least one sensor can include translating the at least one sensor along a longitudinal axis of the catheter.

As is clear from FIG. 11A, blocks 1120 and 1130 may be performed in any order. Stated another way, the shock waves can be generated before and/or after imaging the body lumen. For example, the physician may begin a medical procedure with imaging the body lumen, and then may follow the imaging with IVL. Alternatively, the physician may begin the medical procedure with IVL, and then may follow the IVL with imaging. In some examples, blocks 1120 and 1130 can occur concurrently. In this example, the system may utilize electrical filtering to prevent overlapping and/or interfering signals. Blocks 1120 and 1130 may be repeated any number of times, as desired by the physician. For example, the physician may image, perform IVL, image again, and so on. The opposite scenario is also possible in which the physician performs IVL, images, performs IVL again, etc.

In some examples, the method 1100 may optionally include, at block 1140, further advancing the distal portion of the shock wave catheter through the body lumen such that the distal portion is positioned proximate to the occlusion of the body lumen. The shock wave catheter may be able to be further advanced through the body lumen after imaging and performing IVL on the occlusion of the body lumen, at least because the shock waves may have broken down at least a portion of the lesion, and/or the imaging enables the user to view and navigate the shock wave catheter relative to the occlusion.

Figure 11B:
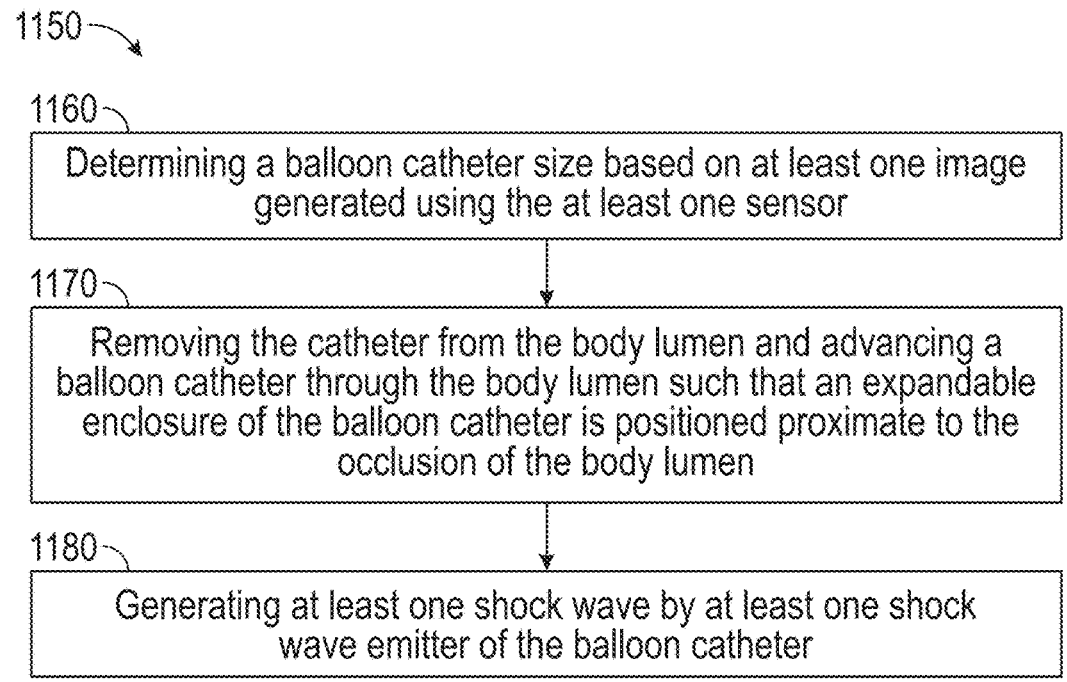
FIG. 11B illustrates an exemplary method for further treating the occlusion of the body lumen after imaging the body lumen, according to one or more aspects of the present disclosure.

In some examples, imaging and IVL with an integrated catheter as described herein may better prepare the body lumen for subsequent angioplasty procedures with a different catheter, such as a balloon IVL catheter. Accordingly, in some examples, the method 1100 depicted in FIG. 11A may be followed by the method 1150 depicted in FIG. 11B. Method 1150 can include, at block 1160, determining a balloon catheter size for the body lumen based on at least one image generated using the sensor of the imaging module. The image can be a cross-sectional image of the body lumen that enables measurement of the body lumen and determination of the vessel size for selecting an accurate size for the balloon catheter. The balloon catheter may be larger than the first shock wave catheter used for IVL and imaging, and/or may include one or more different features from the shock wave catheter that suggest its use in subsequent procedures on the body lumen. For example, the balloon catheter may include a larger or more expandable enclosure than the shock wave catheter used for imaging and initial IVL, and thus the physician may choose to swap out the catheter after IVL and imaging with the first shock wave catheter to complete the procedure with the most appropriately-sized catheter.

At block 1170, the method can include removing the shock wave catheter from the body lumen and advancing the balloon catheter through the body lumen such that an expandable enclosure of the balloon catheter is positioned proximate to the occlusion of the body lumen. At block 1180, the method can include generating at least one shock wave by at least one shock wave emitter of the balloon catheter to treat the occlusion.

In some examples, the imaging and IVL (e.g., with the first shock wave catheter, and/or with the first shock wave catheter followed by a balloon IVL catheter) can be used to prepare the body lumen for stent placement. The method can include determining a stent size for the body lumen based on at least one image generated using the sensor of the image module. The method can include removing the shock wave catheter from the lumen and introducing a catheter-based device having a stent disposed thereon (or therein) to the body lumen proximate to the occlusion of the lumen. The method can include deploying the stent to the occlusion of the body lumen to treat the lumen.

Figure 12:
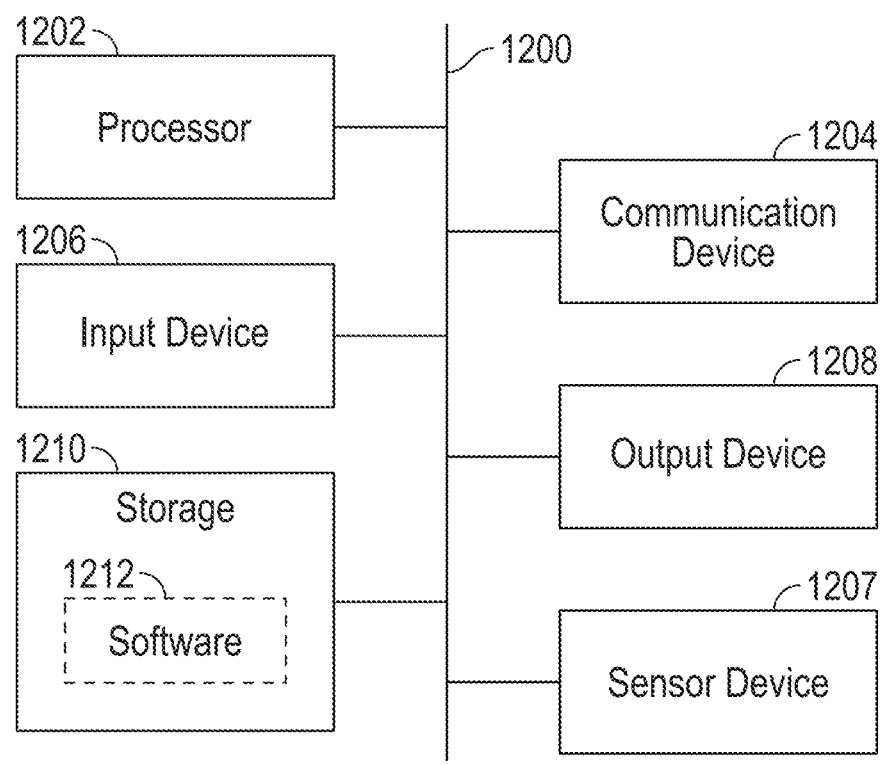
FIG. 12 illustrates an exemplary computing system, according to one or more aspects of the present disclosure.

FIG. 12 depicts an exemplary computing device 1200 that may form part of the shock wave catheter system 150 described above and may be used for performing various steps of the methods described herein, in accordance with one or more examples of the disclosure. Device 1200 can be a host computer connected to a network. Device 1200 can be a client computer or a server. As shown in FIG. 12, device 1200 can be any suitable type of microprocessor-based device, such as a personal computer, workstation, server, or handheld computing device (i.e., a portable electronic device) such as a phone or tablet. The device can include, for example, one or more of processors 1202, input device 1206, sensor device 1207, output device 1208, storage 1210, and communication device 1204. Input device 1206 and output device 1208 can generally correspond to those described above and can either be connectable or integrated with the computer.

Input device 1206 can be any suitable device that provides directed input, such as a touch screen, keyboard or keypad, mouse, or voice-recognition device, in other words, input or directions provided or initiated by a user. Sensor device 1207 can be one or more of any suitable sensor devices, such as an imaging sensor (e.g., any of the imaging sensors described herein) a pressure sensor, a thermal sensor, an electrical sensor (e.g., current, voltage, resistance, and/or impedance sensors), or a visualization element. Output device 1208 can be any suitable device that provides output, such as a touch screen, haptics device, or speaker. Storage 1210 can be any suitable device that provides storage, such as an electrical, magnetic, or optical memory, including a RAM, cache, hard drive, or removable storage disk. Communication device 1204 can include any suitable device capable of transmitting and receiving signals over a network, such as a network interface chip or device. The components of the computer can be connected in any suitable manner, such as via a physical bus or wirelessly.

Sensor devices 1207 can provide feedback to an operator using device 1200 by measuring parameters in the surrounding environment and thereby indicating a status of the device 1200, and further providing for guidance on what further steps the operator may decide to implement with device 1200. For example, in implementations where sensor devices 1207 include pressure sensors, a slight decrease in pressure may indicate success at cracking a calcified lesion, due to the fact that the expandable member surrounding the emitters is able to further expand without changing the volume of fluid within the expandable member. Further, a significant decrease in pressure may indicate a rupture failure mode where the expandable member has lost seal and fluid volume, and thus guiding toward withdrawal of the device. In implementations where the sensor devices include a visualization element, an operator of the device 1200 may be able to more clearly understand where the device 1200 is located relative to a target lesion or anatomy, prior to, during, and after delivering therapy.

Software 1212, which can be stored in storage 1210 and executed by processor 1202, can include, for example, the programming that embodies the functionality of the present disclosure (e.g., as embodied in the devices as described above). Software 1212 can also be stored and/or transported within any non-transitory computer-readable storage medium for use by, or in connection with, an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1210, that can contain or store programming for use by, or in connection with, an instruction execution system, apparatus, or device. Software 1212 can also be propagated within any transport medium for use by, or in connection with, an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by, or in connection with, an instruction execution system, apparatus, or device. The transport-readable medium can include, but is not limited to, an electronic, magnetic, optical, electromagnetic, or infrared wired or wireless propagation medium.

Device 1200 may be connected to a network, which can be any suitable type of interconnected communication system. The network can implement any suitable communication protocols and can be secured by any suitable security protocols. The network can comprise network links of any suitable arrangement that can implement the transmission and reception of network signals, such as wireless network connections, TI or T3 lines, cable networks, DSL, or telephone lines. Device 1200 can implement any operating system suitable for operating on the network. Software 1212 can be written in any suitable programming language, such as C, C++, Java, or Python. In various embodiments, application software embodying the functionality of the present disclosure can be deployed in different configurations, such as in a client/server arrangement or through a web browser as a web-based application or web service, for example.

In some examples, shock wave catheters described herein can be used to treat tissue lesions and characterize said tissue/tissue lesions. FIG. 13A illustrates a distal region of shock wave catheter 1300 for treating and characterizing tissue using ultrasound, according to aspects of the disclosure. Catheter 1300 may be used in shock wave system 150, for example, to characterize the tissue in addition to or instead of imaging the tissue. Catheter 1300 may include one or more shock wave emitters 1330, 1332 and one or more ultrasound transducers 1310, 1312 located inside of enclosure 1320. In some examples, each of ultrasound transducers 1310, 1312 includes a piezoelectric element configured to receive ultrasound or acoustic signals. Ultrasound transducers 1310, 1312, may be positioned along an elongate tube 1340 on proximal and distal sides of shock wave emitters 1330, 1332. In some examples, one or more ultrasound transducers may additionally or alternatively be located between shock wave emitters 1330, 1332. In some examples, the ultrasound transducers 1310, 1312 may be moveable (e.g., rotatable and/or translatable) about a longitudinal axis of the elongate tube 1340, as described above. In some examples, ultrasound transducers 1310, 1312 may be spaced apart from shock wave emitters 1330, 1332 such that the transducers are not damaged during shock wave generation. In some examples, the shock wave catheter 1300 may include at least one barrier element to protect the ultrasound transducers 1310, 1312 from the shock waves emitted by the shock wave emitters 1330, 1332. In some examples, a shock wave catheter may include only one ultrasound transducer inside of the enclosure.

FIG. 13B illustrates a distal region of shock wave catheter 1301 for treating and characterizing tissue using ultrasound, according to aspects of the disclosure. Catheter 1301 may be used in shock wave system 150, for example, to characterize the tissue in addition to or instead of imaging the tissue. Catheter 1301 may include shock wave emitters 1331, 1333 and ultrasound transducers 1311, 1313 located outside of enclosure 1321. In some examples, each of ultrasound transducers 1311, 1313 includes a piezoelectric element configured to receive acoustic signals. Ultrasound transducers 1311, 1313 may be positioned along an elongate tube 1341 on proximal and distal sides of enclosure 1321. In some examples, the ultrasound transducers 1311, 1313 may be moveable (e.g., rotatable and/or translatable) about a longitudinal axis of the elongate tube 1341, as described above.

According to aspects of the disclosure, a shock wave catheter may include ultrasound transducers located both inside and outside of an enclosure and near shock wave emitters. In some examples, at least one ultrasound transducer is located inside of the enclosure and at least one ultrasound transducer is located outside of the enclosure either proximal or distal of the enclosure or both proximal and distal of the enclosure.

As illustrated in FIGS. 13A and 13B, during an intravascular lithotripsy procedure in a body lumen, a shock wave 1350, 1351 generated at a shock wave emitter 1330-1333 may propagate through fluid in an enclosure and impinge upon target tissue. In turn, the impinging shock waves may generate shear waves 1352, 1353 in the tissue to further modify the target tissue.

In some examples of the disclosure, ultrasound transducers (e.g., ultrasound transducers 1310-1313) may receive one or more acoustic signals 1354, 1355 during the procedure in real time. In contrast to conventional intravascular ultrasound imaging or diagnostic devices, which require transmission of ultrasound waves that create echoes whose signals are then analyzed to characterize or image target tissue, ultrasound transducers 1310-1313 may be configured to receive and analyze acoustic signals 1354, 1355 generated by the interaction of shock waves (i.e., the shear waves 1352, 1353) emitted from the shock wave emitters 1330-1333. In some embodiments, one or more piezoelectric elements of one or more of ultrasound transducers 1310-1313 may be configured to be continuously receive acoustic signals 1354, 1355 during the procedure. In some embodiments, one or more ultrasound transducers 1310-1313 may be configured to continuously receive acoustic signals 1354, 1355 and transmit corresponding electrical signals to a signal processing unit. The signal processing unit may use a signal processing algorithm to correlate acoustic properties of the target tissue and determine tissue characteristics in real time during the treatment.

Using a shock wave as the signal transmitted to the tissue may provide advantages for tissue characterization over solely relying on an ultrasound signal transmitted from a piezoelectric element. A piezoelectric signal may provide a simple strain measurement of the target tissue, whereas signal from interaction of a shock wave (which applies a known pressure) with the target tissue may provide a quantitative metric of tissue elastography. Further, the above-described shear waves 1352, 1353 may be analyzed for elastography and/or stiffness measurements of target tissue. Acoustic signals received at ultrasound transducers 1310-1313 may also be used to monitor the progress of the treatment in real time. For example, shock wave therapy may be stopped if the target tissue achieves a desired level of elasticity (e.g., to be expanded with dissection of the body lumen). By monitoring treatment progress, fewer shock waves may be needed to achieve a desired level of tissue elasticity, and catheter lifespan may be prolonged.

In some examples, a shock wave catheter having ultrasound transducers and shock wave emitters can determine physical characteristics of target tissue in real time. The shock wave catheter may determine, based at least on acoustic signals received by the ultrasound transducers, one or more of: (1) composition of the tissue, such as a ratio of different tissue types (e.g., calcified tissue, fibrosed tissue, pliant tissue) (2) geometry of the target tissue (e.g., thickness and/or nodularity of target tissue); and/or (3) location of target tissue (e.g., one or more of the axial, radial, or circumferential location relative to the catheter).

In some examples, an exemplary shock wave catheter may include at least one shock wave emitter, at least one imaging sensor for OCT or IVUS imaging, and at least one ultrasound transducer for characterizing the tissue. For example, with reference to catheter 1300 in FIG. 13A, one of the ultrasound transducers 1310, 1312 may be configured for imaging, and the other may be configured for characterizing the tissue.

Shock wave emitters 1330-1333 may include electrohydraulic shock wave emitters, such as those described above with reference to FIGS. 5A-5B. Electrohydraulic shock wave emitters may include one or more electrode pairs, each electrode pair having a spark gap that, when a voltage pulse is applied across the spark gap, generates a shock wave. In some examples, shock wave emitters 1330-1333 may include light emitting regions of optical fibers. Emission of light pulses (e.g., laser pulses) in the enclosure 1320 or 1321 leads to generation of shock waves.

The shock wave emitters 1330-1333 and/or ultrasound transducers 1310-1313 may be moveable relative to the enclosure 1320, 1321 of the shock wave catheter 1301, 1303, as described in greater detail with respect to FIGS. 6A-6C. In some examples, the shock wave catheters 1300, 1301 may include one or more shock wave emitters disposed distal to the one or more ultrasound transducers, and the one or more shock wave emitters may be configured to distally fire shock waves, as described in greater detail with respect to FIG. 7. As noted above, the ultrasound transducers 1310-1313 may be configured to transmit electrical signals to a signal processing unit for processing the signals and determine characteristics of the tissue based on said signals. The signal processing unit may be one or more processors embodied in an external housing, such as housing 120 illustrated and described with respect to FIG. 1A. The processor(s) can be configured for processing electrical signals received from the ultrasound transducers 1310-1313 and characterizing tissue based on said signals. In some examples, the signal processing unit may characterize the tissue based on a user input on a controller. In some examples, the signal processing unit may automatically characterize the tissue in real-time during the procedure. The tissue characterizations determined based on the ultrasound signals may in some examples be displayed (e.g., on display 122 shown in FIG. 1A).

Exemplary Embodiments

The following embodiments are exemplary and are not intended to limit the scope of any invention described herein.

Embodiment 1. A catheter for imaging and treating occlusions of body lumens, comprising:
an elongate tube;
at least one shock wave emitter disposed at a distal portion of the elongate tube and configured to emit shock waves in a distal direction for treating an occlusion in a body lumen;
at least one sensor for imaging the body lumen, the at least one sensor disposed at the distal portion of the elongate tube; and
at least one enclosure enclosing the at least one shock wave emitter.

Embodiment 2. The catheter of embodiment 1, wherein the at least one sensor is moveable relative to the elongate tube.

Embodiment 3. The catheter of embodiment 2, wherein the at least one sensor is rotatable about a longitudinal axis of the elongate tube.

Embodiment 4. The catheter of embodiment 2 or 3, wherein the at least one sensor is translatable along a longitudinal axis of the elongate tube.

Embodiment 5. The catheter of any one of embodiments 2-4, comprising a moveable member extending along at least a portion of a length of the elongate tube and configured to move relative to the elongate tube, wherein the at least one sensor is disposed on the moveable member to move the at least one sensor relative to the elongate tube.

Embodiment 6. The catheter of any one of embodiments 1-5, wherein at least one of the at least one shock wave emitter and the at least one sensor are positioned within the elongate tube.

Embodiment 7. The catheter of any one of embodiments 1-6, wherein at least one of the at least one shock wave emitter and the at least one sensor are positioned outside of the elongate tube.

Embodiment 8. The catheter of any one of embodiments 1-7, wherein the at least one sensor is proximal of the at least one shock wave emitter.

Embodiment 9. The catheter of any one of embodiments 1-8, wherein the at least one enclosure encloses the at least one sensor.

Embodiment 10. The catheter of any one of embodiments 1-9, comprising a barrier element disposed between the at least one sensor and the at least one shock wave emitter to protect the at least one sensor from the shock waves emitted by the at least one shock wave emitter.

Embodiment 11. The catheter of any one of embodiments 1-10, wherein the at least one sensor comprises a plurality of sensors arranged circumferentially around a longitudinal axis of the elongate tube.

Embodiment 12. The catheter of any one of embodiments 1-11, wherein the at least one sensor comprises at least one ultrasound transducer.

Embodiment 13. The catheter of any one of embodiments 1-12, wherein the at least one sensor comprises at least one optical coherence tomography (OCT) sensor.

Embodiment 14. The catheter of embodiment 13, comprising at least one light emitter disposed at the distal portion of the elongate tube and configured to emit light to illuminate the body lumen.

Embodiment 15. The catheter of any one of embodiments 1-14, wherein the at least one shock wave emitter comprises an electrode pair formed by ends of two conductors spaced apart by a gap.

Embodiment 16. The catheter of any one of embodiments 1-15, wherein the at least one shock wave emitter comprises at least one conductive sheath extending around a longitudinal axis of the elongate tube.

Embodiment 17. The catheter of any one of embodiments 1-16, wherein the at least one shock wave emitter comprises at least one optical fiber.

Embodiment 18. The catheter of any one of embodiments 1-17, wherein the at least one shock wave emitter and the at least one sensor are moveable relative to one another.

Embodiment 19. The catheter of embodiment 18, wherein the at least one shock wave emitter is moveable relative to the elongate tube and the at least one sensor is fixed relative to the elongate tube.

Embodiment 20. The catheter of any one of embodiments 1-19, comprising: an inner elongate member extending within the elongate tube; and a moveable member having the at least one shock wave emitter mounted thereon, the moveable member disposed between the inner elongate member and the elongate tube and configured to translate along the inner elongate member.

Embodiment 21. The catheter of embodiment 20, wherein the moveable member has the at least one sensor mounted thereon.

Embodiment 22. The catheter of any one of embodiments 1-21, wherein the at least one shock wave emitter comprises a plurality of shock wave emitters disposed at a distal end of the elongate tube.

Embodiment 23. The catheter of embodiment 22, wherein each shock wave emitter of the plurality of shock wave emitters is configured to generate shock waves that constructively interfere distally of the elongate tube.

Embodiment 24. A catheter for imaging and treating occlusions of body lumens, comprising:
 an elongate tube;
 at least one shock wave emitter disposed at a distal portion of the elongate tube and configured to emit shock waves for treating an occlusion in a body lumen;
 at least one sensor for imaging the body lumen, the at least one sensor disposed at the distal portion of the elongate tube; and
 at least one enclosure enclosing the at least one shock wave emitter, wherein the at least one shock wave emitter and the at least one sensor are moveable relative to one another.

Embodiment 25. The catheter of embodiment 24, wherein the at least one sensor is moveable relative to the elongate tube and the at least one shock wave emitter is fixed relative to the elongate tube.

Embodiment 26. The catheter of embodiment 25, wherein the at least one sensor is rotatable about a longitudinal axis of the elongate tube.

Embodiment 27. The catheter of embodiment 25 or 26, wherein the at least one sensor is translatable along a longitudinal axis of the elongate tube.

Embodiment 28. The catheter of any one of embodiments 25-27, comprising a moveable member extending along at least a portion of a length of the elongate tube and configured to move relative to the elongate tube, wherein the at least one sensor is disposed on the moveable member to move the at least one sensor relative to the elongate tube.

Embodiment 29. The catheter of any one of embodiments 24-28, wherein the at least one shock wave emitter is moveable relative to the elongate tube and the at least one sensor is fixed relative to the elongate tube.

Embodiment 30. The catheter of any one of embodiments 24-29, wherein at least one of the at least one shock wave emitter and the at least one sensor are positioned within the elongate tube.

Embodiment 31. The catheter of any one of embodiments 24-30, wherein at least one of the at least one shock wave emitter and the at least one sensor are positioned outside of the elongate tube.

Embodiment 32. The catheter of any one of embodiments 24-31, wherein the at least one sensor is proximal of the at least one shock wave emitter.

Embodiment 33. The catheter of any one of embodiments 24-32, wherein the at least one sensor is distal of the at least one shock wave emitter.

Embodiment 34. The catheter of any one of embodiments 24-33, wherein the at least one enclosure encloses the at least one sensor.

Embodiment 35. The catheter of any one of embodiments 24-34, comprising a barrier element disposed between the at least one sensor and the at least one shock wave emitter to protect the at least one sensor from the shock waves emitted by the at least one shock wave emitter.

Embodiment 36. The catheter of any one of embodiments 24-35, wherein the at least one shock wave emitter is configured to emit the shock waves in a distal direction.

Embodiment 37. The catheter of any one of embodiments 24-36, wherein the at least one sensor comprises a plurality of sensors arranged circumferentially around a longitudinal axis of the elongate tube.

Embodiment 38. The catheter of any one of embodiments 24-37, wherein the at least one sensor comprises at least one ultrasound transducer.

Embodiment 39. The catheter of any one of embodiments 24-38, wherein the at least one sensor comprises at least one optical coherence tomography (OCT) sensor.

Embodiment 40. The catheter of embodiment 39, comprising at least one light emitter disposed at the distal portion of the elongate tube and configured to emit light to illuminate the body lumen.

Embodiment 41. The catheter of any one of embodiments 24-40, wherein the at least one shock wave emitter comprises an electrode pair formed by ends of two conductors spaced apart by a gap.

Embodiment 42. The catheter of any one of embodiments 24-41, wherein the at least one shock wave emitter comprises at least one conductive sheath extending around a longitudinal axis of the elongate tube.

Embodiment 43. The catheter of any one of embodiments 24-42, wherein the at least one shock wave emitter comprises at least one optical fiber.

Embodiment 44. The catheter of any one of embodiments 24-43, comprising: an inner elongate member extending within the elongate tube; and a moveable member having the at least one shock wave emitter mounted thereon, the moveable member disposed between the inner elongate member and the elongate tube and configured to translate along the inner elongate member.

Embodiment 45. The catheter of embodiment 44, wherein the moveable member has the at least one sensor mounted thereon.

Embodiment 46. The catheter of any one of embodiments 24-45, wherein the at least one shock wave emitter comprises a plurality of shock wave emitters disposed at a distal end of the elongate tube.

Embodiment 47. The catheter of embodiment 46, wherein each shock wave emitter of the plurality of shock wave emitters is configured to generate shock waves that constructively interfere distally of the elongate tube.

Embodiment 48. A catheter for imaging and treating occlusions of body lumens, comprising:
an elongate tube;
at least one shock wave emitter disposed at a distal portion of the elongate tube and configured to emit shock waves for treating an occlusion in a body lumen;
at least one sensor for imaging or characterizing the body lumen, the at least one sensor comprising at least one ultrasound transducer disposed at the distal portion of the elongate tube; and
at least one enclosure enclosing the at least one shock wave emitter.

Embodiment 49. The catheter of embodiment 48, wherein the at least one ultrasound transducer is moveable relative to the at least one shock wave emitter.

Embodiment 50. The catheter of embodiment 49, wherein the at least one ultrasound transducer is rotatable about a longitudinal axis of the elongate tube.

Embodiment 51. The catheter of embodiment 49 or 50, wherein the at least one ultrasound transducer is translatable along a longitudinal axis of the elongate tube.

Embodiment 52. The catheter of any one of embodiments 49-51, comprising a moveable member extending along at least a portion of a length of the elongate tube and configured to move relative to the elongate tube, wherein the at least one ultrasound transducer is disposed on the moveable member to move the at least one sensor relative to the elongate tube.

Embodiment 53. The catheter of any one of embodiments 48-52, wherein the at least one ultrasound transducer is proximal of the at least one shock wave emitter.

Embodiment 54. The catheter of any one of embodiments 48-53, wherein the at least one ultrasound transducer is distal of the at least one shock wave emitter.

Embodiment 55. The catheter of any one of embodiments 48-54, wherein the at least one enclosure encloses the at least one sensor.

Embodiment 56. The catheter of any one of embodiments 48-55, wherein at least one of the at least one shock wave emitter and the at least one sensor are positioned within the elongate tube.

Embodiment 57. The catheter of any one of embodiments 48-56, wherein at least one of the at least one shock wave emitter and the at least one sensor are positioned outside of the elongate tube.

Embodiment 58. The catheter of any one of embodiments 48-57, comprising a barrier element disposed between the at least one ultrasound transducer and the at least one shock wave emitter to protect the at least one sensor from the shock waves emitted by the at least one shock wave emitter.

Embodiment 59. The catheter of any one of embodiments 48-58, wherein the at least one shock wave emitter is configured to emit the shock waves in a distal direction.

Embodiment 60. The catheter of any one of embodiments 48-59, wherein the at least one ultrasound transducer is configured for imaging the body lumen.

Embodiment 61. The catheter of embodiment 60, wherein the at least one ultrasound transducer comprises a plurality of ultrasound transducers arranged circumferentially around a longitudinal axis of the elongate tube.

Embodiment 62. The catheter of any one of embodiments 48-59, wherein the at least one ultrasound transducer is configured for characterizing tissue of the body lumen.

Embodiment 63. The catheter of embodiment 62, wherein the at least one ultrasound transducer is configured to receive acoustic signals based on the shock waves emitted by the at least one shock wave emitter.

Embodiment 64. The catheter of embodiment 62 or 63, wherein characterizing the tissue comprises determining at least one of tissue elastography, composition of the tissue, geometry of the tissue, and location of the tissue.

Embodiment 65. The catheter of any one of embodiments 62-64, wherein the at least one sensor for imaging or characterizing the body lumen comprises at least one ultrasound transducer configured for imaging the body lumen and the at least one ultrasound transducer configured for characterizing tissue of the body lumen.

Embodiment 66. The catheter of any one of embodiments 48-65, wherein the at least one shock wave emitter comprises an electrode pair formed by ends of two conductors spaced apart by a gap.

Embodiment 67. The catheter of any one of embodiments 48-66, wherein the at least one shock wave emitter comprises at least one conductive sheath extending around a longitudinal axis of the elongate tube.

Embodiment 68. The catheter of any one of embodiments 48-67, wherein the at least one shock wave emitter comprises at least one optical fiber.

Embodiment 69. The catheter of any one of embodiments 48-68, wherein the at least one shock wave emitter and the at least one ultrasound transducer are moveable relative to one another.

Embodiment 70. The catheter of embodiment 69, wherein the at least one shock wave emitter is moveable relative to the elongate tube and the at least one ultrasound transducer is fixed relative to the elongate tube.

Embodiment 71. The catheter of any one of embodiments 48-70, comprising:
an inner elongate member extending within the elongate tube; and
a moveable member having the at least one shock wave emitter mounted thereon, the moveable member disposed between the inner elongate member and the elongate tube and configured to translate along the inner elongate member.

Embodiment 72. The catheter of embodiment 71, wherein the moveable member has the at least one ultrasound transducer mounted thereon.

Embodiment 73. The catheter of any one of embodiments 48-72, wherein the at least one shock wave emitter comprises a plurality of shock wave emitters disposed at a distal end of the elongate tube.

Embodiment 74. The catheter of embodiment 73, wherein each shock wave emitter of the plurality of shock wave emitters is configured to generate shock waves that constructively interfere distally of the elongate tube.

Embodiment 75. A system for imaging and treating occlusions of body lumens, comprising:
- a shock wave catheter, comprising:
  - an elongate tube;
  - at least one shock wave emitter disposed at a distal portion of the elongate tube and configured to emit shock waves for treating an occlusion in a body lumen;
  - at least one sensor for imaging the body lumen, the at least one sensor disposed at the distal portion of the elongate tube; and
  - at least one enclosure enclosing the at least one shock wave emitter;
- a pulse generator coupled to the at least one shock wave emitter and configured to generate energy pulses to cause the at least one shock wave emitter to emit the shock waves; and
- an imaging processor coupled to the at least one sensor and configured to generate imaging data of the body lumen based on at least one signal generated by the at least one sensor.

Embodiment 76. The system of embodiment 75, wherein the catheter comprises the catheter of any one of embodiments 1-61 and 66-74.

Embodiment 77. The system of embodiment 75 or 76, wherein the pulse generator and the imaging processor are contained within a single housing.

Embodiment 78. The system of any one of embodiments 75-77, comprising a controller having user controls configured for controlling shock wave generation and controlling imaging.

Embodiment 79. The system of embodiment 78, wherein the user controls are configured for moving the at least one sensor relative to the catheter.

Embodiment 80. The system of embodiment 78 or 79, wherein the user controls are configured for controlling fluid introduction to and/or removal from a fluid lumen of the catheter.

Embodiment 81. The system of any one of embodiments 75-80, wherein the at least one sensor comprises at least one optical coherence tomography (OCT) sensor, and wherein the imaging processor is configured to generate OCT imaging data of the body lumen based on the at least one signal generated by the at least one OCT sensor.

Embodiment 82. The system of embodiment 81, wherein the catheter comprises at least one light emitter disposed at the distal portion of the catheter and configured to emit light to illuminate the body lumen, and wherein the system comprises a light source coupled to the at least one light emitter.

Embodiment 83. The system of embodiment 82, comprising a controller having at least one user control configured for controlling the light source.

Embodiment 84. The system of any one of embodiments 75-83, wherein the at least one sensor comprises at least one ultrasound transducer, and wherein the pulse generator is configured to generate electrical pulses to cause the at least one ultrasound transducer to emit at least one ultrasonic pulse.

Embodiment 85. The system of embodiment 84, wherein the imaging processor is configured to generate ultrasound imaging data of the body lumen based on the at least one signal generated by the at least one ultrasound transducer.

Embodiment 86. The system of any one of embodiments 75-85, wherein the pulse generator is configured to generate at least one laser pulse to cause the at least one shock wave emitter to generate the shock waves.

Embodiment 87. A method for imaging and treating occlusions of body lumens, comprising:
- advancing the distal portion of the catheter of any one of embodiments 1-61 and 66-74 through the body lumen such that the distal portion is positioned proximate to an occlusion of the body lumen;
- generating at least one shock wave by the at least one shock wave emitter to treat the occlusion; and
- imaging the body lumen by the at least one sensor.

Embodiment 88. The method of embodiment 87, wherein the at least one shock wave is generated before and/or after imaging the body lumen.

Embodiment 89. The method of embodiment 87 or 88, comprising determining, based on at least one image generated using the at least one sensor, a balloon catheter size for the body lumen.

Embodiment 90. The method of any one of embodiments 87-89, wherein imaging the body lumen by the at least one sensor comprises moving the at least one sensor relative to the catheter.

Embodiment 91. The method of embodiment 90, wherein moving the at least one sensor comprises rotating the at least one sensor about a longitudinal axis of the catheter.

Embodiment 92. The method of embodiment 90 or 91, wherein moving the at least one sensor comprises translating the at least one sensor along a longitudinal axis of the catheter.

Embodiment 93. The method of any one of embodiments 87-92, wherein imaging the body lumen by the at least one sensor comprises moving the at least one shock wave emitter relative to the elongate tube of the catheter.

Embodiment 94. The method of any one of embodiments 87-93, wherein the at least one shock wave is emitted in a distal direction.

Embodiment 95. The method of any one of embodiments 87-94, comprising delivering at least one voltage pulse to the at least one shock wave emitter to cause the at least one shock wave emitter to generate the at least one shock wave.

Embodiment 96. The method of any one of embodiments 87-94, comprising delivering at least one laser pulse to the at least one shock wave emitter to generate the at least one shock wave.

Embodiment 97. A method for imaging and treating occlusions of body lumens, comprising:
- advancing a distal portion of a catheter through a body lumen such that the distal portion is positioned proximate to an occlusion of the body lumen;
- generating at least one shock wave by at least one shock wave emitter disposed at the distal portion of the catheter to treat the occlusion; and
- following generating the at least one shock wave, imaging the body lumen by at least one sensor disposed at the distal portion of the catheter.

Embodiment 98. The method of embodiment 97, wherein the catheter comprises the catheter of any one of embodiments 1-61 and 66-74.

Embodiment 99. The method of embodiment 97 or 98, wherein imaging the body lumen by the at least one sensor comprises moving the at least one sensor relative to the catheter.

Embodiment 100. The method of embodiment 99, wherein moving the at least one sensor comprises rotating the at least one sensor about a longitudinal axis of the catheter.

Embodiment 101. The method of embodiment 99 or 100, wherein moving the at least one sensor comprises translating the at least one sensor along a longitudinal axis of the catheter.

Embodiment 102. The method of any one of embodiments 97-101, wherein imaging the body lumen by the at least one sensor comprises moving the at least one shock wave emitter relative to the elongate tube of catheter.

Embodiment 103. The method of any one of embodiments 97-102, wherein the at least one shock wave is emitted in a distal direction.

Embodiment 104. The method of any one of embodiments 97-103, comprising delivering at least one voltage pulse to the at least one shock wave emitter to cause the at least one shock wave emitter to generate the at least one shock wave.

Embodiment 105. The method of any one of embodiments 97-103, comprising delivering at least one laser pulse to the at least one shock wave emitter to generate the at least one shock wave.

Embodiment 106. A system for characterizing and treating occlusions of body lumens, comprising:
  a shock wave catheter, comprising:
    an elongate tube;
    at least one shock wave emitter disposed at a distal portion of the elongate tube and configured to emit shock waves for treating an occlusion in a body lumen;
    at least one ultrasound transducer for characterizing tissue of the body lumen, the at least one ultrasound transducer disposed at the distal portion of the elongate tube; and
    at least one enclosure enclosing the at least one shock wave emitter;
  a pulse generator coupled to the at least one shock wave emitter and configured to generate energy pulses to cause the at least one shock wave emitter to emit the shock waves; and
  a signal processing unit coupled to the at least one ultrasound transducer and configured to determine at least one characteristic of the tissue based on at least one signal generated by the at least one ultrasound transducer.

Embodiment 107. The system of embodiment 106, wherein the at least one ultrasound transducer is configured to receive acoustic signals based on the shock waves emitted by the at least one shock wave emitter.

Embodiment 108. The system of embodiment 106 or 107, wherein the pulse generator and the signal processing unit are contained within a single housing.

Embodiment 109. The system of any one of embodiments 106-108, comprising a controller having user controls configured for controlling shock wave generation and controlling tissue characterization.

Embodiment 110. The system of embodiment 109, wherein the user controls are configured for moving the at least one sensor relative to the catheter.

Embodiment 111. The system of embodiment 109 or 110, wherein the user controls are configured for controlling fluid introduction to and/or removal from a fluid lumen of the catheter.

Embodiment 112. The system of any one of embodiments 106-111, wherein the pulse generator is configured to generate at least one laser pulse to cause the at least one shock wave emitter to generate the shock waves.

Embodiment 113. The system of any one of embodiments 107-112, wherein the catheter comprises at least one sensor configured for imaging the body lumen, and the system comprises an imaging processor coupled to the at least one sensor and configured to generate imaging data of the body lumen based on at least one signal generated by the at least one sensor.

Embodiment 114. The system of embodiment 113, wherein the pulse generator, the signal processing unit, and the imaging processor are contained within a single housing.

Embodiment 115. The system of embodiment 113 or 114, comprising a controller having user controls configured for controlling shock wave generation, controlling imaging, and controlling tissue characterization.

Embodiment 116. The system of any one of embodiments 113-115, wherein the at least one sensor for imaging comprises at least one optical coherence tomography (OCT) sensor, and wherein the imaging processor is configured to generate OCT imaging data of the body lumen based on the at least one signal generated by the at least one OCT sensor.

Embodiment 117. The system of embodiment 116, wherein the catheter comprises at least one light emitter disposed at the distal portion of the catheter and configured to emit light to illuminate the body lumen, and wherein the system comprises a light source coupled to the at least one light emitter.

Embodiment 118. The system of embodiment 117, comprising a controller having at least one user control configured for controlling the light source.

Embodiment 119. The system of any one of embodiments 113-115, wherein the at least one sensor for imaging comprises at least one ultrasound transducer, and wherein the pulse generator is configured to generate electrical pulses to cause the at least one ultrasound transducer to emit at least one ultrasonic pulse.

Embodiment 120. The system of embodiment 119, wherein the imaging processor is configured to generate ultrasound imaging data of the body lumen based on the at least one signal generated by the at least one ultrasound transducer.

Embodiment 121. A method for characterizing and treating occlusions of body lumens, comprising:
  advancing the distal portion of a catheter through the body lumen such that the distal portion is positioned proximate to an occlusion of the body lumen;
  generating at least one shock wave by at least one shock wave emitter disposed at the distal portion of the catheter to treat the occlusion; and
  following generating the at least one shock wave, determining at least one characteristic of tissue of the body lumen based on at least one acoustic signal generated by at least one ultrasound transducer disposed at the distal portion of the catheter.

Embodiment 122. The method of embodiment 121, wherein determining the at least one characteristic of the tissue comprises receiving the at least one acoustic signal at the at least one ultrasound transducer based on the at least one shock wave generated by the at least one shock wave emitter.

Embodiment 123. The method of embodiment 122, wherein determining one or more characteristics of the tissue comprises determining, at a signal processing unit coupled to the at least one ultrasound transducer, the at least one characteristic based on the acoustic signal.

Embodiment 124. The method of any one of embodiments 121-123, wherein the at least one characteristic comprises at least one of tissue elastography, composition of the tissue, geometry of the tissue, and location of the tissue.

Embodiment 125. The method of any one of embodiments 121-124, wherein the at least one shock wave is emitted in a distal direction.

Embodiment 126. The method of any one of embodiments 121-125, comprising delivering at least one voltage pulse to the at least one shock wave emitter to cause the at least one shock wave emitter to generate the at least one shock wave.

Embodiment 127. The method of any one of embodiments 121-125, comprising delivering at least one laser pulse to the at least one shock wave emitter to generate the at least one shock wave.

Embodiment 128. The method of any one of embodiments 121-127, comprising imaging the body lumen by at least one imaging sensor configured for imaging.

Embodiment 129. The method of embodiment 128, wherein the at least one shock wave is generated before and/or after imaging the body lumen.

Embodiment 130. The method of embodiment 128 or 129, comprising determining, based on at least one image generated using the at least one sensor, a balloon catheter size for the body lumen.

Embodiment 131. The method of any one of embodiments 128-130, wherein imaging the body lumen by the at least one sensor comprises moving the at least one sensor relative to the catheter.

Embodiment 132. The method of embodiment 131, wherein moving the at least one sensor comprises rotating the at least one sensor about a longitudinal axis of the catheter.

Embodiment 133. The method of embodiment 131 or 132, wherein moving the at least one sensor comprises translating the at least one sensor along a longitudinal axis of the catheter.

Embodiment 134. The method of any one of embodiments 129-133, wherein imaging the body lumen by the at least one sensor comprises moving the at least one shock wave emitter relative to the elongate tube of the catheter.

Although the electrode assemblies and catheter devices described herein have been discussed primarily in the context of treating occlusions in vasculature, the electrode assemblies and catheters herein can be used for a variety of occlusions, such as occlusions in the peripheral vasculature (e.g., above-the-knee, below-the-knee, iliac, carotid, etc.), occlusions in the coronary vasculature, heart valve (e.g., aortic valve) occlusions, etc. For further examples, various embodiments may be used for treating soft tissues, such as cancer and tumors (i.e., non-thermal ablation methods), blood clots, fibroids, cysts, organs, scar and fibrotic tissue removal, or other tissue destruction and removal. Electrode assembly and catheter designs could also be used for neurostimulation treatments, targeted drug delivery, treatments of tumors in body lumens (e.g., tumors in blood vessels, the esophagus, intestines, stomach, or vagina), wound treatment, non-surgical removal and destruction of tissue, or used in place of thermal treatments or cauterization for venous insufficiency and fallopian ligation (i.e., for permanent female contraception).

In one or more examples, the electrode assemblies and catheters described herein could also be used for tissue engineering methods, for instance, for mechanical tissue decellularization to create a bioactive scaffold in which new cells (e.g., exogenous or endogenous cells) can replace the old cells; introducing porosity to a site to improve cellular retention, cellular infiltration/migration, and diffusion of nutrients and signaling molecules to promote angiogenesis, cellular proliferation, and tissue regeneration similar to cell replacement therapy. Such tissue engineering methods may be useful for treating ischemic heart disease, fibrotic liver, fibrotic bowel, and traumatic spinal cord injury (SCI). For instance, for the treatment of SCI, the devices and assemblies described herein could facilitate the removal of scarred spinal cord tissue, which acts like a barrier for neuronal reconnection, before the injection of an anti-inflammatory hydrogel loaded with lentivirus to genetically engineer the spinal cord neurons to regenerate.

It should be noted that the elements and features of the example catheters illustrated throughout this specification and drawings may be rearranged, recombined, and modified without departing from the present invention. For instance, while this specification and drawings describe and illustrate catheters having several example balloon designs, the present disclosure is intended to include catheters having a variety of balloon configurations. The number, placement, and spacing of the electrode pairs of the shock wave generators can be modified without departing from the subject invention. Further, the number, placement, and spacing of balloons of catheters can be modified without departing from the subject invention.

It should be understood that the foregoing is only illustrative of the principles of the invention, and that various modifications, alterations, and combinations can be made by those skilled in the art without departing from the scope and spirit of the invention. Any of the variations of the various catheters disclosed herein can include features described by any other catheters or combination of catheters herein. Furthermore, any of the methods can be used with any of the catheters disclosed. Accordingly, it is not intended that the invention be limited, except as by the appended claims.

What is claimed is:

1. A catheter for imaging and treating occlusions of body lumens, comprising:
   an elongate tube;
   at least one shock wave emitter disposed at a distal portion of the elongate tube and configured to emit shock waves in a distal direction for treating an occlusion in a body lumen;
   at least one sensor for imaging the body lumen, the at least one sensor disposed at the distal portion of the elongate tube;
   at least one enclosure enclosing the at least one shock wave emitter; and
   a moveable member extending along at least a portion of a length of the elongate tube and configured to move relative to the elongate tube, wherein the at least one sensor is disposed on the moveable member to move the at least one sensor relative to the elongate tube.

2. The catheter of claim 1, wherein the at least one sensor is rotatable about a longitudinal axis of the elongate tube.

3. The catheter of claim 1, wherein the at least one sensor is translatable along a longitudinal axis of the elongate tube.

4. The catheter of claim 1, wherein at least one of the at least one shock wave emitter and the at least one sensor are positioned within the elongate tube.

5. The catheter of claim 1, wherein at least one of the at least one shock wave emitter and the at least one sensor are positioned outside of the elongate tube.

6. The catheter of claim 1, wherein the at least one sensor is proximal of the at least one shock wave emitter.

7. The catheter of claim 1, wherein the at least one enclosure encloses the at least one sensor.

8. The catheter of claim 1, comprising a barrier element disposed between the at least one sensor and the at least one shock wave emitter to protect the at least one sensor from the shock waves emitted by the at least one shock wave emitter.

9. The catheter of claim 1, wherein the at least one sensor comprises a plurality of sensors arranged circumferentially around a longitudinal axis of the elongate tube.

10. The catheter of claim 1, wherein the at least one sensor comprises at least one ultrasound transducer.

11. The catheter of claim 1, wherein the at least one sensor comprises at least one optical coherence tomography (OCT) sensor.

12. The catheter of claim 11, comprising at least one light emitter disposed at the distal portion of the elongate tube and configured to emit light to illuminate the body lumen.

13. The catheter of claim 1, wherein the at least one shock wave emitter comprises an electrode pair formed by ends of two conductors spaced apart by a gap.

14. The catheter of claim 1, wherein the at least one shock wave emitter comprises at least one conductive sheath extending around a longitudinal axis of the elongate tube.

15. The catheter of claim 1, wherein the at least one shock wave emitter comprises at least one optical fiber.

16. The catheter of claim 1, wherein the at least one shock wave emitter and the at least one sensor are moveable relative to one another.

17. The catheter of claim 1, wherein the at least one sensor is moveable relative to the elongate tube and the at least one shock wave emitter is fixed relative to the elongate tube.

18. The catheter of claim 1, comprising:
an inner elongate member extending within the elongate tube,
wherein the moveable member has the at least one shock wave emitter mounted thereon, the moveable member is disposed between the inner elongate member and the elongate tube, and the moveable member is configured to translate along the inner elongate member.

19. The catheter of claim 1, wherein the at least one shock wave emitter comprises a plurality of shock wave emitters disposed at a distal end of the elongate tube.

20. The catheter of claim 19, wherein each shock wave emitter of the plurality of shock wave emitters is configured to generate shock waves that constructively interfere distally of the elongate tube.

21. A catheter for imaging and treating occlusions of body lumens, comprising:
an elongate tube;
at least one shock wave emitter disposed at a distal portion of the elongate tube and configured to emit shock waves for treating an occlusion in a body lumen;
at least one sensor for imaging the body lumen, the at least one sensor disposed at the distal portion of the elongate tube;
at least one enclosure enclosing the at least one shock wave emitter; and
a moveable member extending along at least a portion of a length of the elongate tube and configured to move relative to the elongate tube, wherein the moveable member is configured to move the at least one shock wave emitter and the at least one sensor relative to one another.

22. A catheter for imaging and treating occlusions of body lumens, comprising:
an elongate tube;
at least one shock wave emitter disposed at a distal portion of the elongate tube and configured to emit shock waves for treating an occlusion in a body lumen;
at least one sensor for imaging or characterizing the body lumen, the at least one sensor comprising at least one ultrasound transducer disposed at the distal portion of the elongate tube;
at least one enclosure enclosing the at least one shock wave emitter; and
a moveable member extending along at least a portion of a length of the elongate tube and configured to move relative to the elongate tube, wherein the moveable member is configured to move the at least one shock wave emitter and the at least one sensor relative to one another.

23. A method for imaging and treating occlusions of body lumens, comprising:
advancing a distal portion of a catheter through a body lumen such that the distal portion of the catheter is positioned proximate to an occlusion of the body lumen;
generating at least one shock wave by at least one shock wave emitter disposed at the distal portion of the catheter to treat the occlusion, where the at least one shock wave is emitted in a distal direction;
following generating the at least one shock wave, moving a moveable member of the catheter to move at least one sensor disposed at the distal portion of the catheter; and
following generating the at least one shock wave, imaging the body lumen by the at least one sensor.

24. The method of claim 23, wherein the catheter comprises at least one enclosure enclosing the at least one shock wave emitter.

25. The method of claim 23, wherein moving the moveable member comprises moving the movable member to move the at least one shock wave emitter and the at least one sensor relative to one another.

26. The method of claim 25, wherein moving the at least one sensor comprises rotating the at least one sensor about a longitudinal axis of the catheter.

27. The method of claim 25, wherein moving the at least one sensor comprises translating the at least one sensor along a longitudinal axis of the catheter.

28. The method of claim 23, wherein moving the moveable member comprises moving the at least one shock wave emitter relative to an elongate tube of the catheter that supports the at least one shock wave emitter and the at least one sensor.

29. The method of claim 23, comprising delivering at least one voltage pulse to the at least one shock wave emitter to cause the at least one shock wave emitter to generate the at least one shock wave.

30. The method of claim 23, comprising delivering at least one laser pulse to the at least one shock wave emitter to generate the at least one shock wave.

* * * * *